(12) United States Patent
Jutla

(10) Patent No.: US 10,511,581 B2
(45) Date of Patent: Dec. 17, 2019

(54) PARALLELIZABLE ENCRYPTION USING KEYLESS RANDOM PERMUTATIONS AND AUTHENTICATION USING SAME

(71) Applicant: International Business Machines Corporation, Armonk, NY (US)

(72) Inventor: Charanjit S. Jutla, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 14/943,194

(22) Filed: Nov. 17, 2015

(65) Prior Publication Data

US 2017/0142081 A1    May 18, 2017

(51) Int. Cl.
| | | |
|---|---|---|
| *H04L 9/32* | (2006.01) | |
| *H04L 29/06* | (2006.01) | |
| *H04L 9/06* | (2006.01) | |
| *H04L 9/08* | (2006.01) | |

(52) U.S. Cl.
CPC .......... *H04L 63/061* (2013.01); *H04L 9/0631* (2013.01); *H04L 9/0637* (2013.01); *H04L 9/0869* (2013.01); *H04L 9/3236* (2013.01)

(58) Field of Classification Search
CPC ......... H04L 63/061; H04L 9/006; H04L 9/30; H04L 9/3239
See application file for complete search history.

(56) References Cited

U.S. PATENT DOCUMENTS

| 5,937,066 A | * | 8/1999 | Gennaro | ............... | H04L 9/0841 |
| | | | | | 380/286 |
| 6,535,980 B1 | | 3/2003 | Kumar et al. | | |
| 6,963,976 B1 | * | 11/2005 | Jutla | ..................... | H04L 9/0637 |
| | | | | | 707/999.009 |
| 7,093,126 B1 | | 8/2006 | Jutla | | |

(Continued)

OTHER PUBLICATIONS

Yap et al.; Ttl: Parallelizable MAC revisited; Journal Ttl: Security and Communication Networks, vol. 7, No. 7, pp. 1115-1127; 2014; Publisher: Wiley-Blackwell; Country of Publication: USA; ISSN: 1939-0114; Database: SciSearch(R).

(Continued)

*Primary Examiner* — Samson B Lemma
(74) *Attorney, Agent, or Firm* — Harrington & Smith

(57) ABSTRACT

First and second computer systems exchange randomness and the first computer system derives a uniformly random key from the randomness. The first computer system encrypts a multitude of blocks of plaintext using the uniformly random key to create a corresponding multitude of blocks of ciphertexts. The exchanging, deriving, and encrypting each uses a public random permutation. The first computer system transmits the multitude of blocks of ciphertexts to the second computer system. Another example includes the first computer system exchanging randomness and deriving the uniformly random key. The first computer system generates an authentication tag on a multitude of blocks of plaintexts. The exchanging, deriving, and generating each uses a public random permutation. The first (Continued)

computer system sends the authentication tag and the multitude of blocks of plaintext to the second computer system for authentication of the plaintext by the second computer system. Systems, methods, and program products are disclosed.

17 Claims, 16 Drawing Sheets

(56) References Cited

U.S. PATENT DOCUMENTS

| | | | |
|---|---|---|---|
| 7,702,910 B2* | 4/2010 | Gehrmann | H04L 9/0841 709/227 |
| 8,000,467 B2 | 8/2011 | Elbaz et al. | |
| 8,126,139 B2 | 2/2012 | Rose et al. | |
| 8,341,417 B1 | 12/2012 | McGrew | |
| 8,452,984 B2 | 5/2013 | Garay et al. | |
| 9,054,857 B2 | 6/2015 | Leech | |
| 2002/0051537 A1 | 5/2002 | Rogaway | |
| 2006/0171532 A1 | 8/2006 | Iketani et al. | |
| 2010/0086132 A1* | 4/2010 | Tavernier | H04L 9/304 380/255 |
| 2011/0179281 A1 | 7/2011 | Chevallier-Mames et al. | |
| 2013/0077780 A1 | 3/2013 | Rogaway | |
| 2013/0287205 A1 | 10/2013 | Leech | |
| 2016/0006568 A1* | 1/2016 | Minematsu | H04L 9/0643 713/189 |
| 2017/0250967 A1* | 8/2017 | Martineau | H04L 9/0866 |

OTHER PUBLICATIONS

Da-Yin et al., Ttl: A parallelizable message authentication code; Journal Ttl: Journal of Software, vol. 18, No. 7, pp. 1756-1764; 2007; Publisher: Science Press; County of Publication: China; ISSN: 1000-9825; Database: INSPEC.

Biryukov et al. Ttl: PAEQ: Parallelizable Permutation-Based Authenticated Encryption; Conf. Ttl: information Security, 17th International Conference, ISC 2014; 2014; Publisher: Springer International Publishing, Country of Publication, Switzerland, ISBN: 9783319132563, Database; INSEC Even, et al., "A Construction of a Cipher From a Single Pseudorandom Permutation", Proc. Asiacrypt, 1991.

Wun-She Yap, Sze Ling Yeo, Swee-Huay Heng, and Matt Henricksen "Parallelizable MAC Revisted" A*Star, Institute for Infocomm Research, Singapore, Faculty of Information Science & Technology, Multimedia University, Malasia; Published online Jul. 10, 2013 in Wiley Online Library (wileyonlinelibrary.com). DOI: 10.1002/sec. 842.

Advanced Encryption Standard (AES), FIPS 197, 2001, 47 pgs.

Bellare, M., et al., "A concrete security treatment of symmetric encryption", In 38th FOCS, IEEE Computer Society Press, Oct. 1997, pp. 394-403.

Bellare, M. et al., "Random oracles are practical: A paradigm for designing efficient protocols", In V. Ashby,k editor, ACM CCS 93, ACM Press, Nov. 1993, pp. 62-73.

Bertoni, Guido, et al., "Duplexing the sponge: single-pass authenticated encryption and other applications", In A. Miri and S. Vaudenay, editors, SAC 2011, vol. 7118 of LNCS, Springer, Aug. 2011, pp. 320-337.

Black, J., et al., "Encryption-Scheme Security in the Presence of Key-Dependent Messages", In K. Nyberg and H. M. Heys, editors, SAC 2002, vol. 2595 of LNCS, Springer, Aug. 2002, pp. 62-75.

Canetti, R., "Universally Composable Security: A New Paradigm for Cryptographic Protocols", In 42nd FOCS, IEEE Computer Society Press, Oct. 2002, pp. 136-145.

Canetti, R., et al., "Universally Composable Security with Global Setup", In S.P. Vadham, editor, TCC 2007, vol. 4392 of LNCS, Springer, Feb. 2007, pp. 61-85.

Coron, Jean-Sebastien, et al., "Merkle-Damaged Revisited: how to Construct a Hash Function", In V. Shoup, editor, CRYPTO 2005, vol. 3621 of LNCS, Springer, Aug. 2005, pp. 430-448.

Daemen, J., "Limitations of the Even-Mansour construction (rump session)", in H. Imai, R. L. Rivest, and T. Matsumoto, editors, ASIACRYPT 91, vol. 739 of LNCS, Springer, Nov. 1991, pp. 495-498.

Jutla, C.S., "Encryption Modes with Almost Free Message Integrity", In B. Pfitzmann, editor, EUROCRYPT 2001, vol. 2045 of LNCS, Springer, May 2001, pp. 529-544.

Jutla, C.S., "Encryption Modes with Almost Free Message Integrity", Journal of Cryptology, 21(4), Oct. 2008, pp. 547-578.

Krawczyk, Hugo, "LFSR-based Hashing and Authentication", In Y. Desmedt, editor, CRYPTO 94, vol. 839 of LNCS, Springer, Aug. 1994, pp. 129-139.

Kurosawa, Kaoru, "Power of a Public Random Permutation and Its Application to Authenticated Encryption", IEEE Transactions on Information Theory, vol. 56, No. 10, Oct. 2010, pp. 5366-5374.

Maurer, U.M. et al., "Indifferentiability, Impossibility Results on Reductions, and Applications to the Random Oracle Methodology", In M. Naor, editor, TCC 2004, vol. 2951 of LNCS, Springer, Feb. 2004, pp. 21-39.

Pfitzmann, Birgit, et al., "Composition and Integrity Preservation of Secure Reactive Systems", In S. Jajodia and P. Samarati, editors, ACM CCS 00, ACM Press, Nov. 2000, pp. 245-254.

Rogaway, Phillip, et al., "OCB: A Block-Cipher Mode of Operation for Efficient Authenticated Encryption", ACM Journal Name, vol. V, No. N, M 2003, pp. 1-39.

"Secure Has Standard (SHS)", FIPS PUB 180-4, 2012, 31 pgs.

"SHA-3 Standard: Permutation-Based Hash and Extendable-Output Functions", Draft FIPS PUB 202, May 2014, 27 pgs.

"eBACS: ECRYPT Benchmarking of Cryptographic Systems, List of stream ciphers measured", ECRYPT II, http://bench.cr.yp.to/primitives-stream.html; Nov. 2015, 13 pgs.

Bertoni, Guido, et al., "On the Indifferentiability of the Sponge Construction", In N.P. Smart, editor, EUROCRYPT 2008, vol. 4965 of LNCS, Springer, Apr. 2008, pp. 181-197.

Camenisch, Jan, et al., "An Efficient System for Non-transferable Anonymous Credentials with Optional Anonymity Revocation", In B. Pfitzmann, editor, EUROCRYPT 2001, vol. 2045 of LNCS, Springer, May 2001, pp. 93-118.

Bertoni, G., et al., "Keccak", In T. Johansson and P.Q. Nguyen, editors, EUROCRYPT 2013, vol. 7881 of LNCS, Springer, May 2013, pp. 313-314.

* cited by examiner

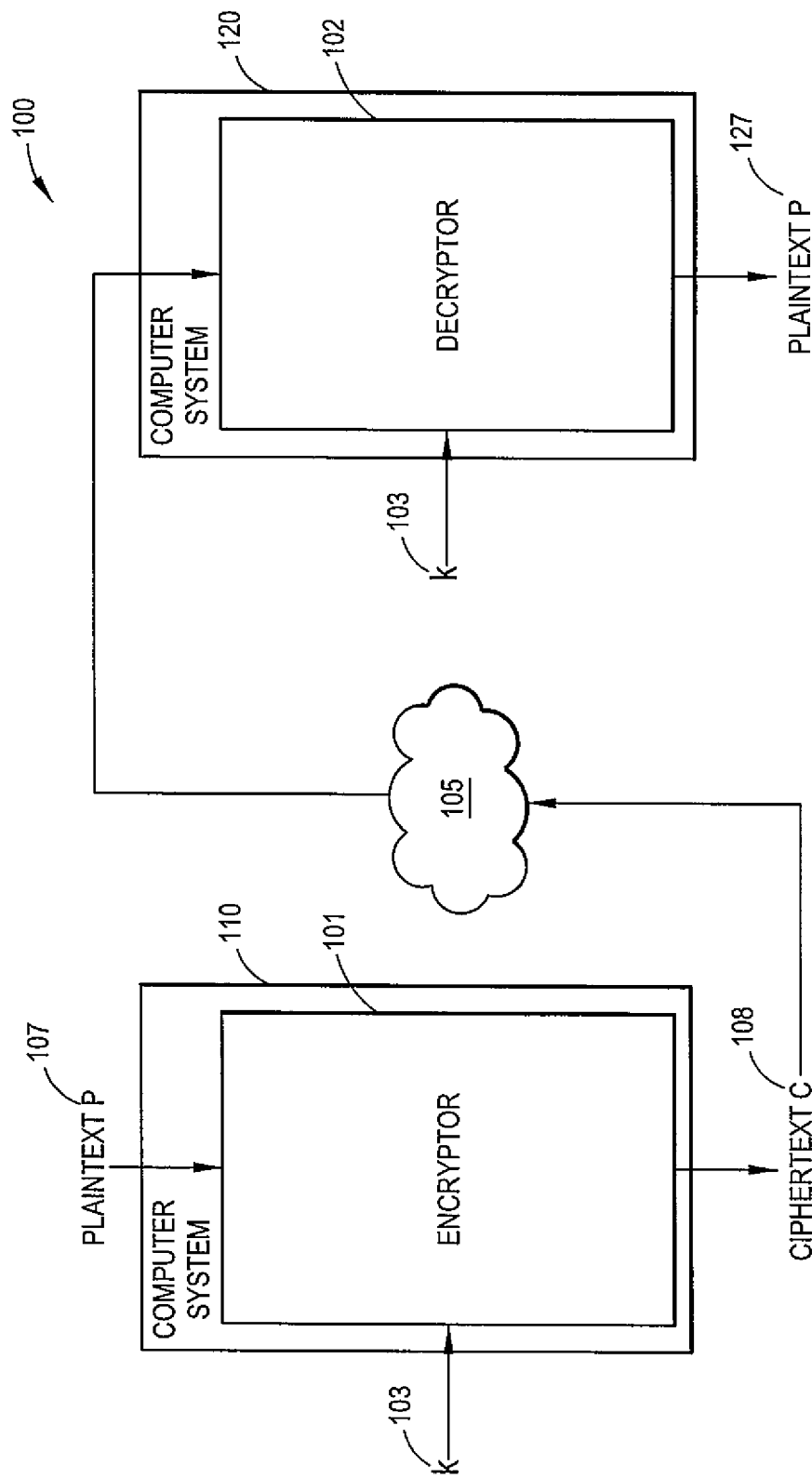
FIG.1: FIG.1A

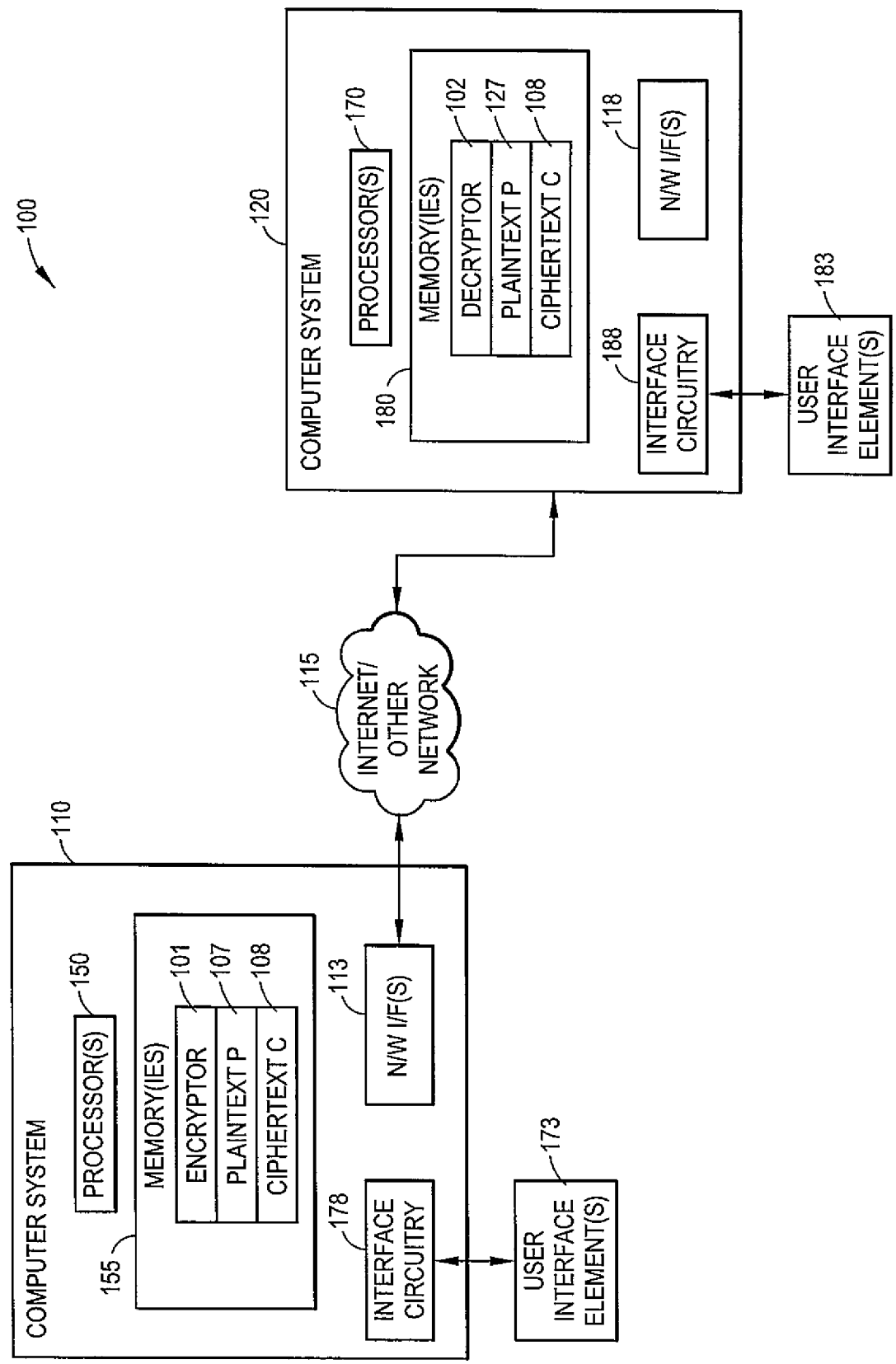
FIG.1: FIG.1B

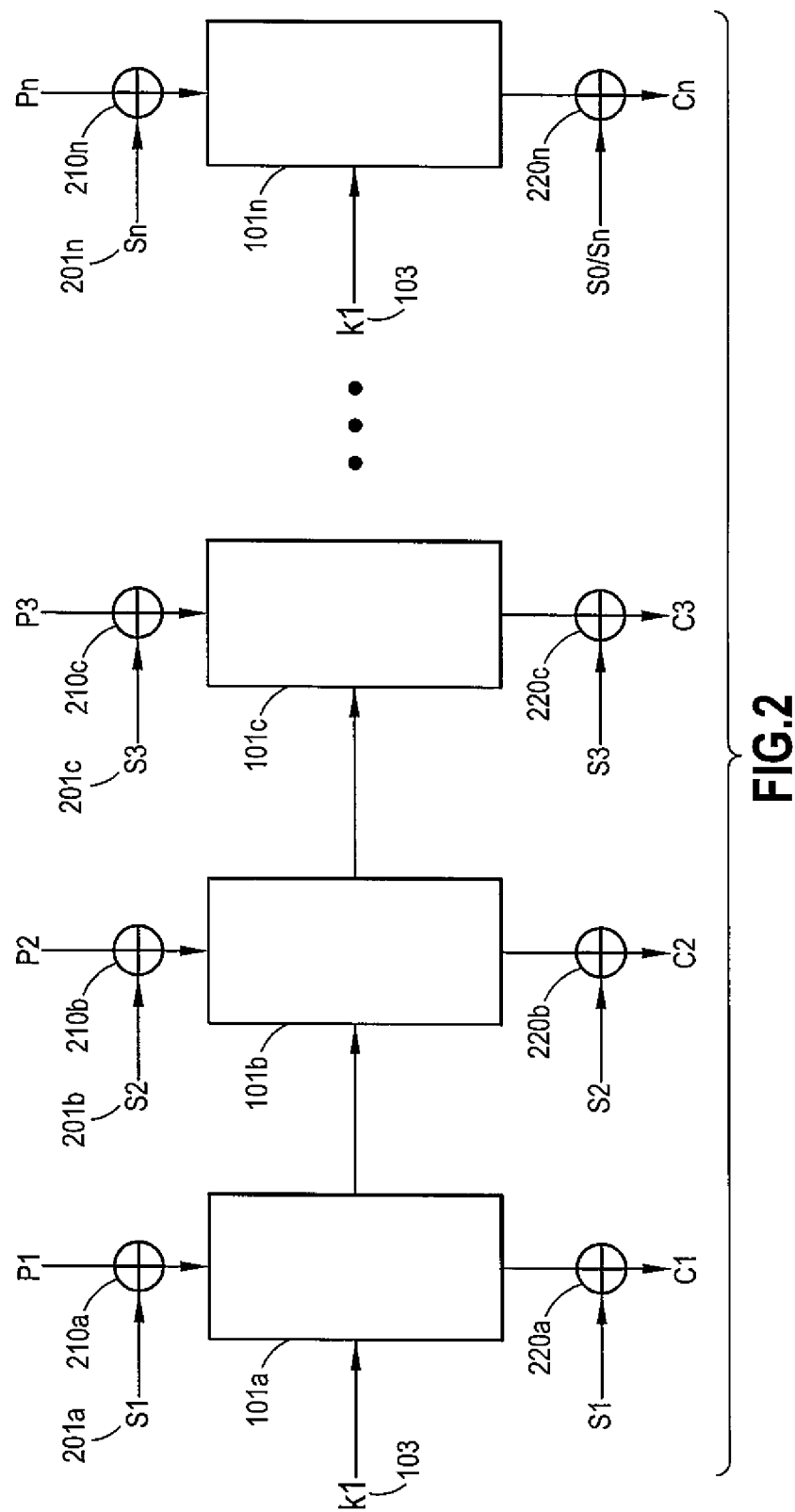

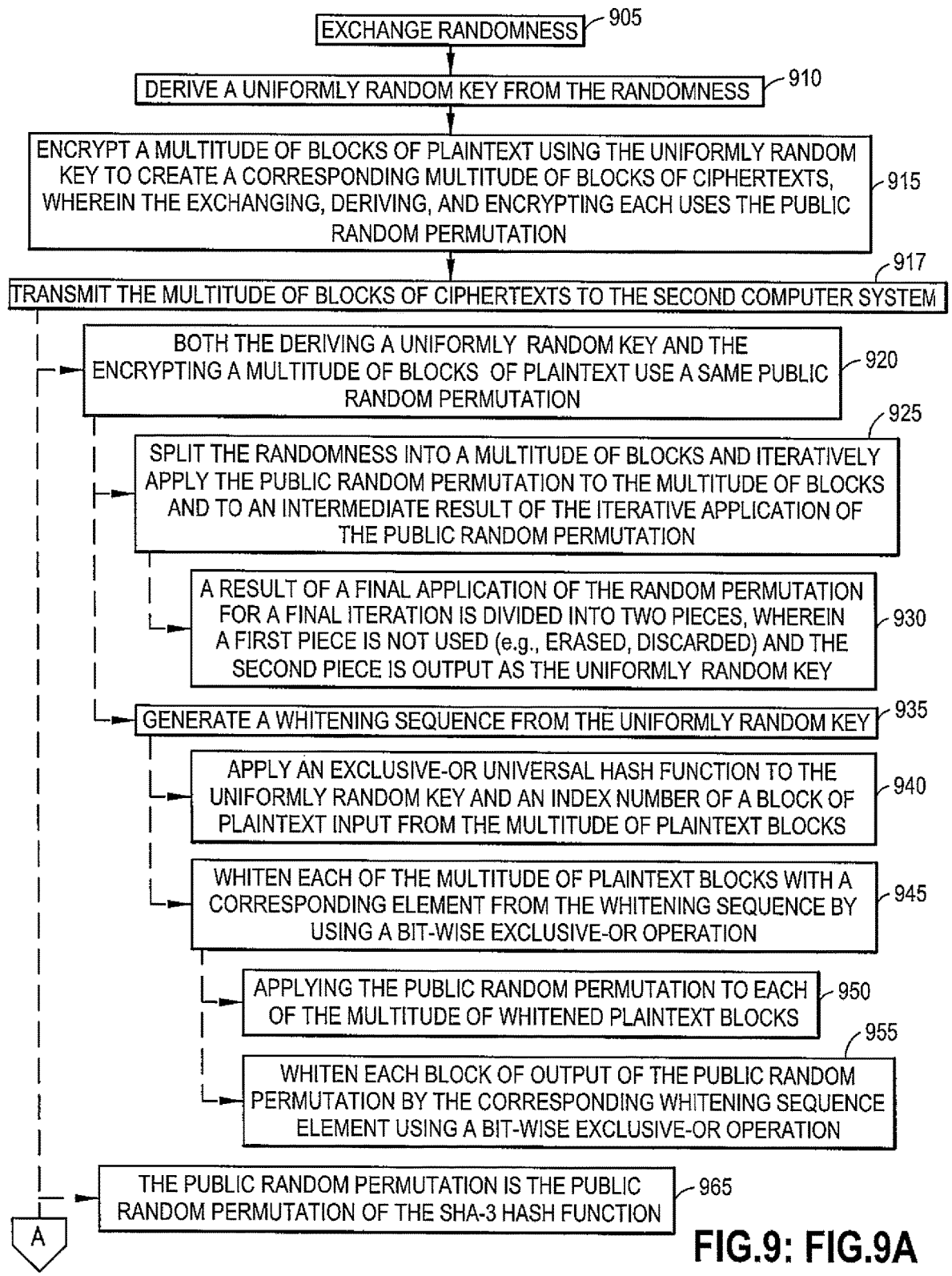
FIG.9: FIG.9A

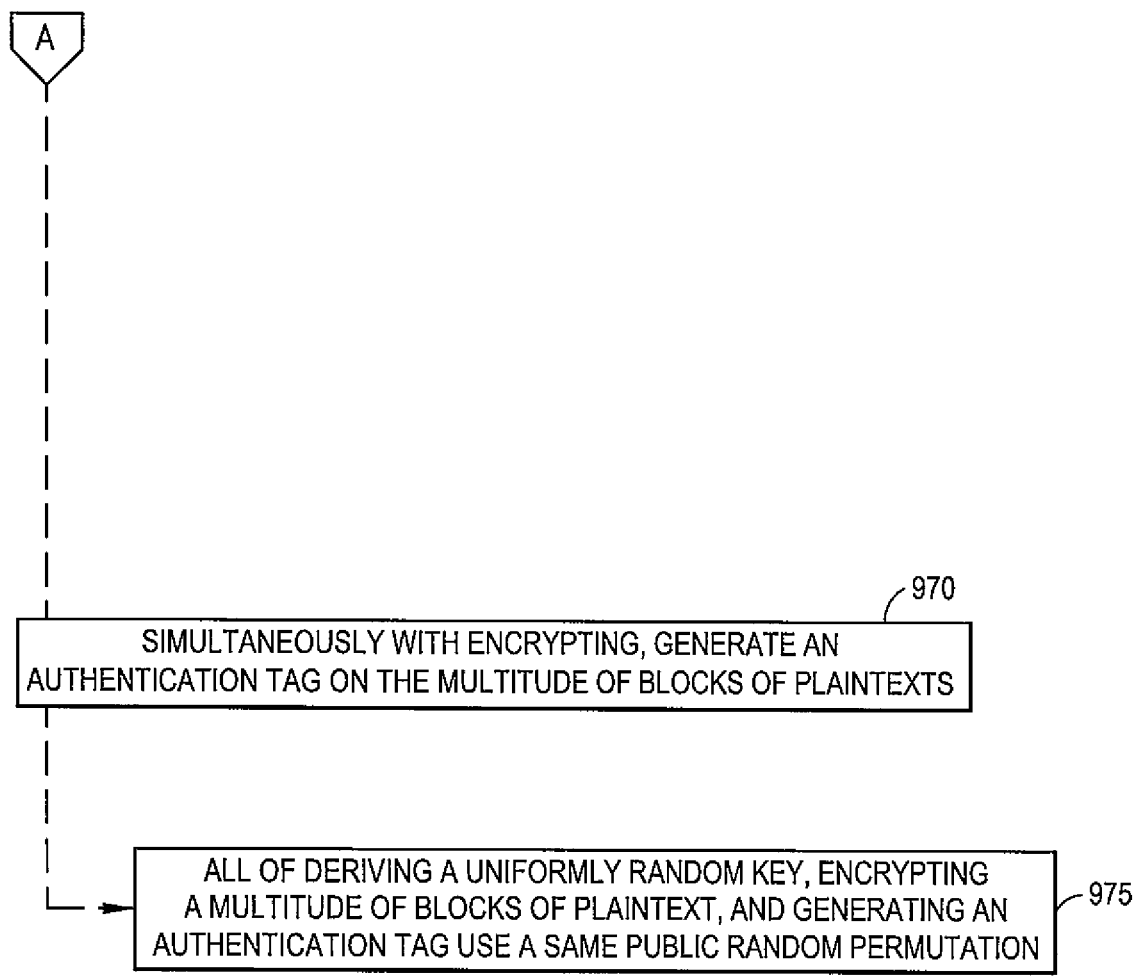
FIG.9: FIG.9B

PARALLELIZABLE ENCRYPTION USING KEYLESS RANDOM PERMUTATIONS AND AUTHENTICATION USING SAME

BACKGROUND

The present invention relates to secure and authenticated communication and storage, and more particularly by use of public random permutations.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the detailed description section.

In modern cryptography, secure communication between two parties entails a key exchange protocol followed by symmetric key encryption and/or authentication. A key exchange protocol allows the two communicating parties to establish a common secret key, i.e., a key that is secret to the rest of the world. It is usually required that this key be a uniformly random sequence of bits as far as the rest of the world is concerned. After the establishment of the key, the two parties can communicate with each other using symmetric key cryptography. The term "symmetric" is used to emphasize that both parties have the same key, and their operations are symmetric.

Symmetric key encryption is usually performed using a keyed block cipher. A block cipher operates on a fixed sized block of input, e.g., 128 bits. For example, Advanced Encryption Standard (AES) is such a block cipher. However, if one wants to communicate a large amount of data, i.e., much larger than 128 bits, then one must use one of the well-known algorithms (also called modes) that can employ the fixed block-size block cipher. Examples of such algorithms or modes of operations are Cipher-Block-Chain (CBC), Counter-Mode, Integrity-Aware-Parallelizable Mode (IAPM), Offset-Code-Book (OCB), and the like. The latter two modes also provide authentication of the message being communicated (i.e., a proof that the message was not maliciously modified during communication or even sent by someone not in possession of the common secret key). A mode which provides both authentication and secrecy is called an authenticated encryption mode.

Although there are many encryption schemes that use keys for permutations, it would be beneficial to have schemes that use permutations that are keyless, where such schemes allow an authenticated encryption mode as an option.

SUMMARY

This section is, intended to include examples and is not intended to be limiting.

In an exemplary embodiment, a method is disclosed for conducting encrypted communication using a public random permutation. The method includes exchanging randomness, wherein the exchanging occurs between first and second computer systems, and deriving by the first computer system a uniformly random key from the randomness. The method further includes encrypting by the first computer system a multitude of blocks of plaintext using the uniformly random key to create a corresponding multitude of blocks of ciphertexts. The exchanging, deriving, and encrypting each uses the public random permutation. The method also includes transmitting by the first computer system the multitude of blocks of ciphertexts to the second computer system.

In a further exemplary embodiment, a computer program product includes a computer-readable storage medium. The computer-readable storage medium includes computer readable code that, when executed by a computer system, causes the computer system to perform the following: exchanging randomness, wherein the computer system is a first computer system and wherein the exchanging occurs between the first computer system and a second computer system; deriving by the first computer system a uniformly random key from the randomness; encrypting by the first computer system a multitude of blocks of plaintext using the uniformly random key to create a corresponding multitude of blocks of ciphertexts, wherein the exchanging, deriving, and encrypting each uses a public random permutation; and transmitting by the first computer system the multitude of blocks of ciphertexts to the second computer system.

In another exemplary embodiment, a computer system is disclosed for conducting encrypted communication using a public random permutation. The computer system includes one or more memories comprising computer-readable code, and one or more processors configuring the apparatus, in response to execution of the computer-readable code, to perform the following: exchanging randomness, wherein the computer system is a first computer system and wherein the exchanging occurs between the first computer system and a second computer system; deriving by the first computer system a uniformly random key from the randomness; encrypting by the first computer system a multitude of blocks of plaintext using the uniformly random key to create a corresponding multitude of blocks of ciphertexts, wherein the exchanging, deriving, and encrypting each uses a public random permutation; and transmitting by the first computer system the multitude of blocks of ciphertexts to the second computer system.

In an additional exemplary embodiment, a method is disclosed that includes exchanging randomness, wherein the exchanging occurs between first and second computer systems, and deriving by the first computer system a uniformly random key from the randomness. The method includes generating by the first computer system an authentication tag on a multitude of blocks of plaintexts. The exchanging, deriving, and generating each uses a public random permutation. The method also includes sending by the first computer system the authentication tag and the multitude of blocks of plaintext to the second computer system for authentication of the plaintext by the second computer system.

In another exemplary embodiment, a computer system is disclosed that includes one or more memories comprising computer-readable code, and one or more processors configuring the apparatus, in response to execution of the computer-readable code, to perform the following: exchanging randomness, wherein the exchanging occurs between first and second computer systems; deriving by the first computer system a uniformly random key from the randomness; generating by the first computer system an authentication tag on a multitude of blocks of plaintexts, wherein the exchanging, deriving, and generating each uses a public random permutation; and sending by the first computer system the authentication tag and the multitude of blocks of plaintext to the second computer system for authentication of the plaintext by the second computer system.

In a further exemplary embodiment, a computer program product includes a computer-readable storage medium. The computer-readable storage medium includes computer readable code that, when executed by a computer system, causes the computer system to perform the following: exchanging randomness, wherein the exchanging occurs between first and second computer systems; deriving by the first computer system a uniformly random key from the randomness; generating by the first computer system an authentication tag on a multitude of blocks of plaintexts, wherein the exchanging, deriving, and generating each uses a public random permutation; and sending by the first computer system the authentication tag and the multitude of blocks of plaintext to the second computer system for authentication of the plaintext by the second computer system.

BRIEF DESCRIPTION OF THE SEVERAL VIEWS OF THE DRAWINGS

FIGS. 1A and 1B are collectively referred to herein as FIG. 1, where FIG. 1A generally illustrates a symmetric key encryption/decryption process and system and FIG. 1B illustrates exemplary implementations of the computer systems used in FIG. 1A;

FIG. 2 describes a mode of operation, in particular IAPM-style encryption;

FIGS. 9A and 9B (collectively referred to as FIG. 9) are a logic flow diagram for conducting encrypted communication using a public random permutation, and illustrate the operation of an exemplary method, a result of execution of computer program instructions embodied on a computer readable memory, functions performed by logic implemented in hardware, and/or interconnected means for performing functions in accordance with exemplary embodiments;

DETAILED DESCRIPTION

Figure 3:
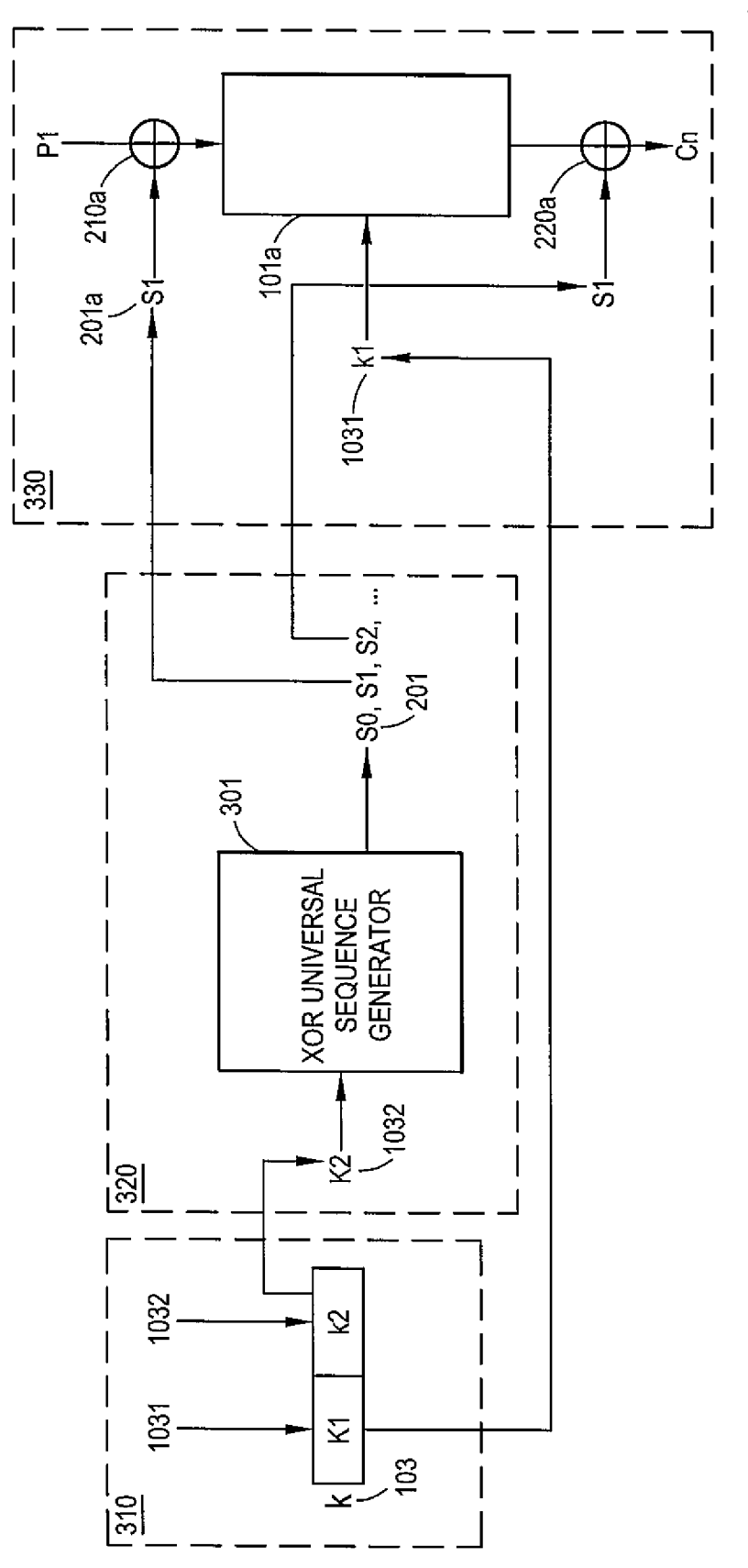
FIG. 3 describes how the whitening sequence S1, S2, ..., Sn is generated using a second key k2.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As stated above, although there are many encryption schemes that use keys for permutations, it would be beneficial to have schemes that use permutations that are keyless, where such schemes allow an authenticated encryption mode as an option.

The present exemplary embodiments relate more to the IAPM and OCB modes of operation of authenticated encryption. The mode IAPM, as the name suggests, is highly parallelizable, i.e., each block of the long message can be processed in parallel. To achieve this while maintaining security, the IAPM mode (and similarly the OCB mode) requires that there be two secret keys shared between the communicating parties. The first key k1 is used in the block cipher, and the second key k2 is used to pre- and post-process each of the inputs and outputs, respectively, of the block cipher invocations. The second key k2 is used to generate what is known as whitening bits (128 bits each for each block to be encrypted).

In many authenticated encryption modes, these whitening bits are just bit-wise exclusive-or-ed (XORed) to the input (plaintext) before the plaintext is block encrypted, and similarly, bit-wise XORed to the output of the block cipher. Since each block of the input message is prescribed to use a different whitening block, usually generated by an XOR-universal hash function using the key k2 and the index of the block to be encrypted, it can be shown that this parallelizable mode continues to be secure.

In addition, an authentication tag (for authentication purposes) can also be generated by just encrypting a last block which comprises an XOR-sum of all the plaintext blocks (pre- and post-processed with its whitening block material as described above).

As for the key exchange protocol, which is used to generate the common keys (i.e., k1 and k2), this protocol usually involves two steps. The first step is usually a public key cryptography protocol which allows the two parties to authenticate each other and simultaneously generate common randomness, i.e., a sequence of bits R which are random to the rest of the world. However, these bits R are not uniformly random, and the symmetric key algorithms described above require that the key used in their operation be uniformly random to assure full security. Thus, the randomness R is further processed using a key-derivation function, which has the property that this function converts a large block of randomness R which is not necessarily random but has enough entropy into a smaller block of bits k which is uniformly random. This k can be large enough, e.g., 512 bits so that it can be split into two keys k1 and k2 each of 256 bits (as an example).

The key-derivation-functions are well known, and some of them employ a hash function, such as SHA-2 or SHA-3. Examples of key derivation functions include CBC mode employing the hash function (instead of a keyed-block cipher). A recent key-derivation function is the sponge construction from the SHA-3 standard, and it uses as an underlying building block a random (but publicly known) permutation on 1600 bit blocks. We will refer to this as the SHA-3 public random permutation. It is random in the sense that it is hard to distinguish it from a permutation on 1600 bits chosen at random. It has been thoroughly cryptoanalyzed in this respect.

It is also known that authenticated encryption mode IAPM (and OCB) can also use a public random permutation instead of a keyed-block cipher like AES. In other words, while the AES block cipher requires a key (k1), the public random permutation is keyless.

Thus, we can replace the keyed-block cipher by the public random permutation and still maintain security. The secrecy is maintained because the whitening key k2 is still used, and it can be shown that the pre- and post-processing performed using the whitening material generated from the key k2 (e.g., using an XOR-universal hash function) suffices for security of authenticated encryption. This requires that the key k2 be uniformly random.

Consequently, according to an exemplary embodiment, a method includes generating a common uniformly random key and using the common random key to encrypt and/or authenticate a message, both steps using the same public random permutation such as the SHA-3 public random permutation.

It is a non-trivial matter to prove that the same public random permutation can be used in both the generation of the uniformly random key, and in its use in the encryption method. The mathematical proofs require expertise in the field of mathematics of cryptography, and only by a mathematical proof can such a scheme be deemed secure. Below, there is a description including such a mathematical proof.

FIG. 1A generally illustrates a symmetric key encryption/decryption process and system 100, and more particularly describes a symmetric key block cipher. FIG. 1B illustrates exemplary implementations of the computer systems used in FIG. 1A, and FIGS. 1A and 1B are collectively referred to as FIG. 1 herein. The block encryptor (101), in a computer system 110, encrypts one block of plaintext P 107 (say, 128 bits) using a secret key k 103. The result of the encryption is called a ciphertext C 108. The computer system 110 transmits the ciphertext C 108 via an insecure communication medium 105 to the computer system 120. The computer system 120 can be considered to be remote from the computer system 110, as the two computer systems are separated by the insecure communication medium 105. The same ciphertext can be decrypted using a block decryptor (102) which also takes the same key k 103 as an additional input and creates plaintext P 127 (which should be equivalent to plaintext P 107). Since the key for encryption and decryption is the same, this is referred to as symmetric key encryption.

In FIG. 1B, the system 100 comprises the computer systems 110 and 120, which communicate via the network 115 (as an insecure communication medium 105). The computer system 110 comprises one or multiple processors 150, one or more multiple memories 155, interface circuitry 178, and one or more network (N/W) interfaces (I/F(s)) 113. The computer system 110 may include or be connected to one or more user interface elements 173. The one or more memories 155 comprise the encryptor 101, the plaintext P 107, and the ciphertext C 108. The encryptor 101 comprises functionality as described herein and comprises computer-readable code that, when executed by the one or more processors 150, cause the computer system 110 to perform the functionality described herein. The encryptor 101 may also be implemented (in part or completely) as hardware, such as being internal to the one or more processors 150. For instance, certain processors from Intel (Intel Corporation is an American multinational technology company headquartered in Santa Clara, Calif. and manufactures semiconductor chips) now support encryption in hardware such as supporting the SHA. Similar implementation in hardware may be made for the encryptor 101 (and the decryptor 102, described below).

The computer system 120 comprises one or multiple processors 170, one or more multiple memories 180, interface circuitry 188, and one or more network (N/W) interfaces (I/F(s)) 118. The computer system 120 may include or be connected to one or more user interface elements 183. The one or more memories 180 comprise the decryptor 102, the plaintext P 127, and the ciphertext C 108. The decryptor 102 comprises functionality as described herein and comprises computer-readable code that, when executed by the one or more processors 170, cause the computer system 120 to perform the functionality described herein. The decryptor 102 may also be implemented (in part or completely) as hardware, such as being internal to the one or more processors 180.

The computer readable memories 155 and 180 may be of any type suitable to the local technical environment and may be implemented using any suitable data storage technology, such as semiconductor based memory devices, flash memory, magnetic memory devices and systems, optical memory devices and systems, fixed memory and removable memory, or some combination of these. The computer readable memories 155 and 180 may be means for performing storage functions. The processors 150 and 170 may be of any type suitable to the local technical environment, and may include one or more of general purpose processors, special purpose processors, microprocessors, gate arrays, programmable logic devices, digital signal processors (DSPs) and processors based on a multi-core processor architecture, or combinations of these, as non-limiting examples. The processors 150 and 170 may be means for performing functions, such as controlling the computer systems 110 and 120, respectively, and other functions as described herein.

The network interfaces 113 and 118 may be wired and/or wireless and communicate over the Internet/other network 115 via any communication technique. The insecure communication medium 105 may also be a wireless communication channel, or any other medium over which data can be communicated.

The user interface elements 173 and 183 may include, for instance, one or more of keyboards, mice, trackballs, displays (e.g., touch screen or non-touch screen), and the like. The computer systems 110 and 120 may be personal computer systems, laptops, wireless devices such as smartphones and tablets, or any other device that uses encryption techniques.

FIG. 2 describes a mode of operation, in particular Integrity Aware Parallelizable Mode (IAPM)-style encryption. The schematic for this figure is more general than just the particular scheme IAPM, as many other modes use the same methodology, e.g., OCB. A mode of operation for block ciphers takes a block cipher which only encrypts one block (e.g., 128 bits), and gives a method to encrypt a large number of blocks together.

As shown in FIG. 2, this mode is encrypting n blocks (where n can be arbitrarily large). The mode in FIG. 2 uses additional key material shown as S1, S2, . . . , Sn (201a, 201b, . . . , 201n). The key to the block cipher (101a, 101b, 101c, . . . , 101n) is the same key k 103, now called k1. A separate key k2 is used to generate the sequence of bits (or numbers) S1, S2 . . . , Sn. To encrypt the first block (P1) from a multitude of plaintext blocks P1 to Pn, the first block is first bit-wise XORed (using XOR 210a) with S1, and then fed to the block encryptor 101a. For this reason the sequence S1 201a, S2 201b, . . . , Sn 201n is called the whitening sequence. Note that there are embodiments where $S_0$ is required (shown as $S_0/S_n$ in FIG. 2), and then there are others where $S_n$ might work for the encryptor 101n. The output of 101a is bit-wise XORed (using XOR 220-1) with the same S1 to produce the first block of the large ciphertext. These operations are continued using all of the plaintext blocks P2 through Pn, the block ciphers 101b through 101n, and corresponding XORs 210b through 210-n and 220b through 220n. Some additional, though similar operations, also result in an authentication tag, and thus such a methodology can generate not just the ciphertext but also an authentication tag on the whole multitude of plaintext blocks, and hence such a mode is called an authenticated encryption mode.

FIG. 3 describes how the whitening sequence S1, S2, . . . , Sn is generated using a second key k2 1032. The secret key for the full mode can be considered as split into two keys k1 1031 and k2 1031, as illustrated by reference 310. The key k1 1031 is used in the block encryptor/decryptor, as illustrated by reference 330, and key k2 1032 is used to generate the whitening sequence, as illustrated by reference 320. The whitening sequence is generated from k2 using an XOR-universal sequence generator 301.

Figure 4:
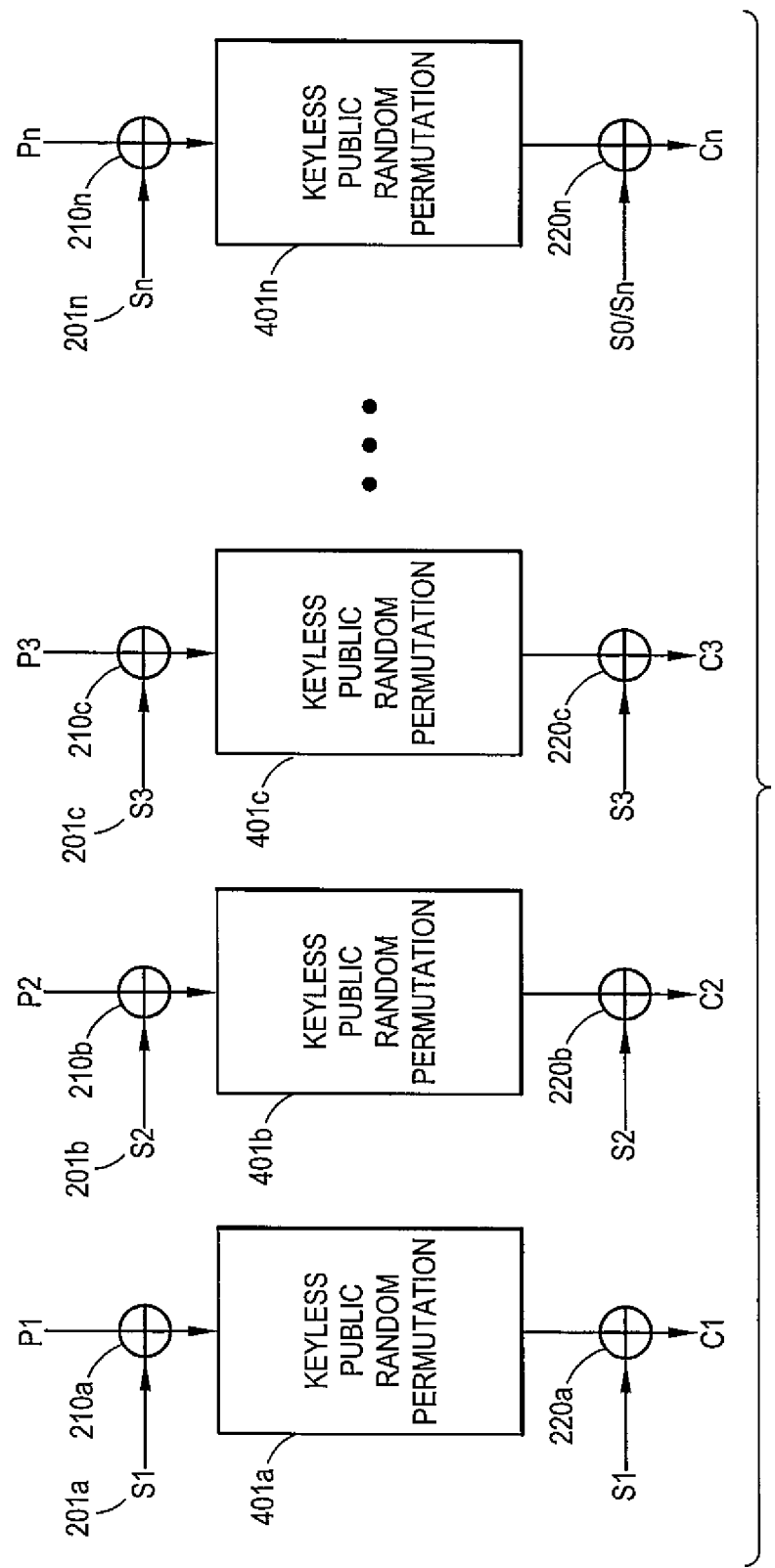
FIG. 4 describes an exemplary IAPM construction but with a keyless random permutation.

FIG. 4 describes the IAPM construction but with a keyless random permutation. Here, the block encryptor/decryptor 101 is replaced by a keyless permutation 401 (that is, keyless public random permutations 401a, 401b, 401c, . . . , 401n). Note that the key k1 103 is not used anymore. A block encryptor 101 is also a permutation but as described earlier, the block encryptor 101 takes a secret key as additional input. A keyless permutation is a permutation on say, 128 bits, and does not need any key.

For this reason, a keyless permutation is called a public (and random) permutation, as anyone can compute and invert the permutation (as it is also known to be an efficiently invertible permutation). The secrecy of the plaintext in the ciphertext is achieved by just the whitening sequence S1, S2, . . . , Sn which, as recalled, uses a secret key k2.

It has been shown that this mode of operation (i.e., with keyed block cipher replaced by keyless public random permutation) remains secure (i.e., maintains complete secrecy of plaintext in the ciphertext). For instance, see Kaoru Kurosawa, "Power of a Public Random Permutation and its Application to Authenticated Encryption", IEEE Tran. on Information Theory, 2010 [17].

Figure 5:
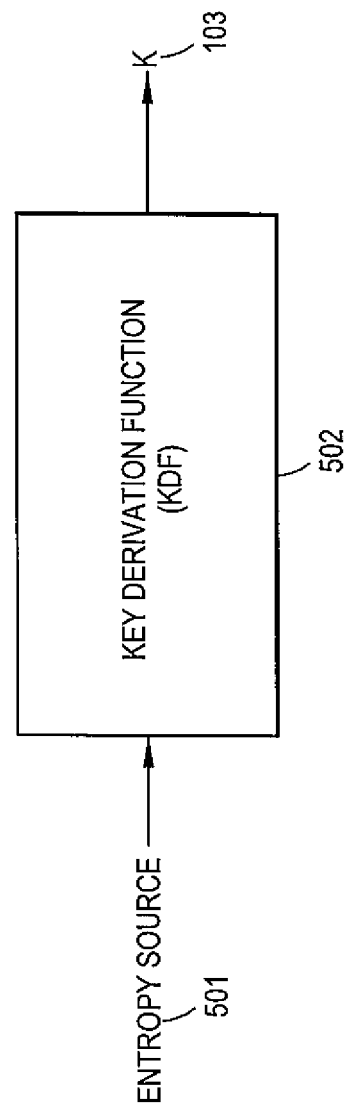
FIG. 5 describes how the secret keys used in the schemes described in earlier figures are obtained, e.g., via key derivation from raw entropy.

FIG. 5 describes how the secret keys used in the schemes described in earlier figures are obtained, e.g., via key derivation from raw entropy. Note that we are dealing with symmetric key cryptography, where both the encrypting party and the decrypting party have the same key k. The question naturally arises as to how they ended up obtaining this secret key. Normally, the two parties are remotely located and it is unlikely that they could have met in a private place to set up this common key. So, this common key is usually generated using public key cryptography, which results in a large number of bits (raw entropy source 501) being shared between the two parties, though not necessarily uniformly random.

The earlier symmetric key schemes/modes described above required that the keys be secret and uniformly random to outsiders. Thus, this entropy source 501, which is not necessarily uniformly random, needs to be converted to 128/256/512 bits of uniformly random bits. This is achieved by what is known as a key-derivation function 502, which produces the key k 103.

Figure 6:
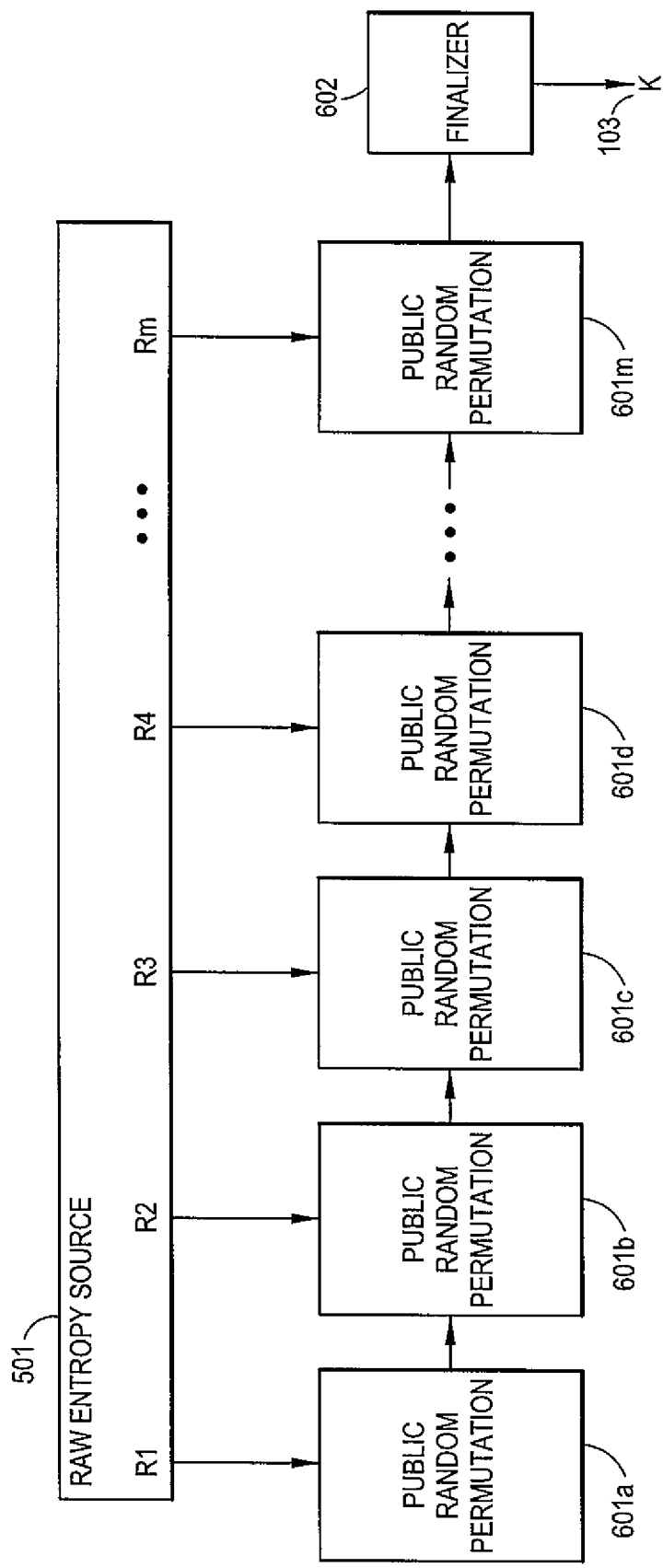
FIG. 6 describes a general methodology for key-derivation functions, particularly a key derivation function using keyless (public) random permutation.

FIG. 6 describes a general methodology for key-derivation functions. The raw entropy source 501 (e.g., a raw entropy source divided into pieces) is broken down into blocks R1, R2, . . . , Rm. A public random permutation 601a, 601b, 601c, 601d, . . . , 601m (recall the keyless public random permutation of FIG. 4) is then used iteratively on these blocks to generate a uniformly random key k 103. A final operation of finalizing in the finalizer 602 may also be employed. The finalizer 602 may, for example, shrink the input further by applying the hash function or by some other simple means.

Figure 7:
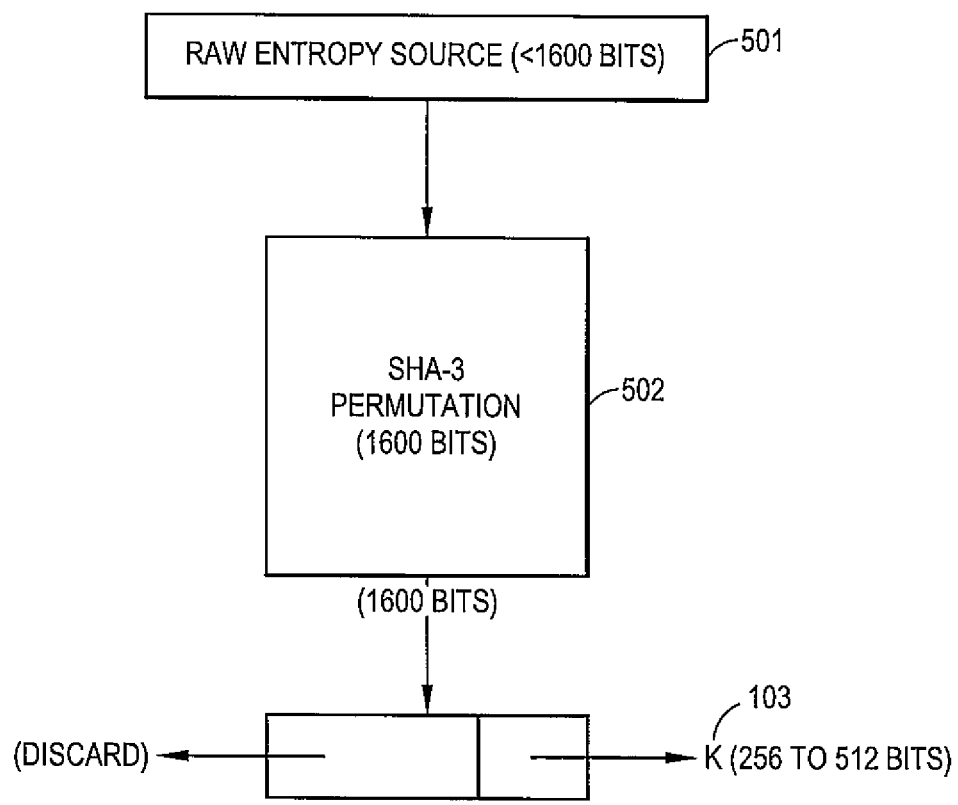
FIG. 7 describes a specific key-derivation function using a public random permutation.

FIG. 7 describes a particularly simple key-derivation function. If the entropy source 501 is less than 1600 bits (e.g., obtained using 1024 bit Diffie-Hellman key exchange, or Elliptic Curve Diffie-Hellman Key exchange), then the SHA-3 hash function's public random permutation 502 can be used to generate a uniformly random key (anywhere from 128 bits to 512 bits, as an example range). The SHA-3 public random permutation 502 is an example of the public random permutation 601a from FIG. 6 and operates on 1600 bits of input to produce 1600 bits of output. SHA-3's public random permutation has been extensively analyzed (cryptoanalyzed) so that it is considered as good as picking a random permutation on 1600 bits. This is why it is called a random permutation. The raw entropy source (501) is fed to the SHA3 public random permutation (502), and the resulting output of 1600 bits is broken into two parts (e.g., by a finalizer 602 as in FIG. 6). The first part is discarded (or erased) and the second part (e.g., 128 to 512 bits) is the output of the key-derivation function, i.e., the uniformly random key k 103.

Figure 8:
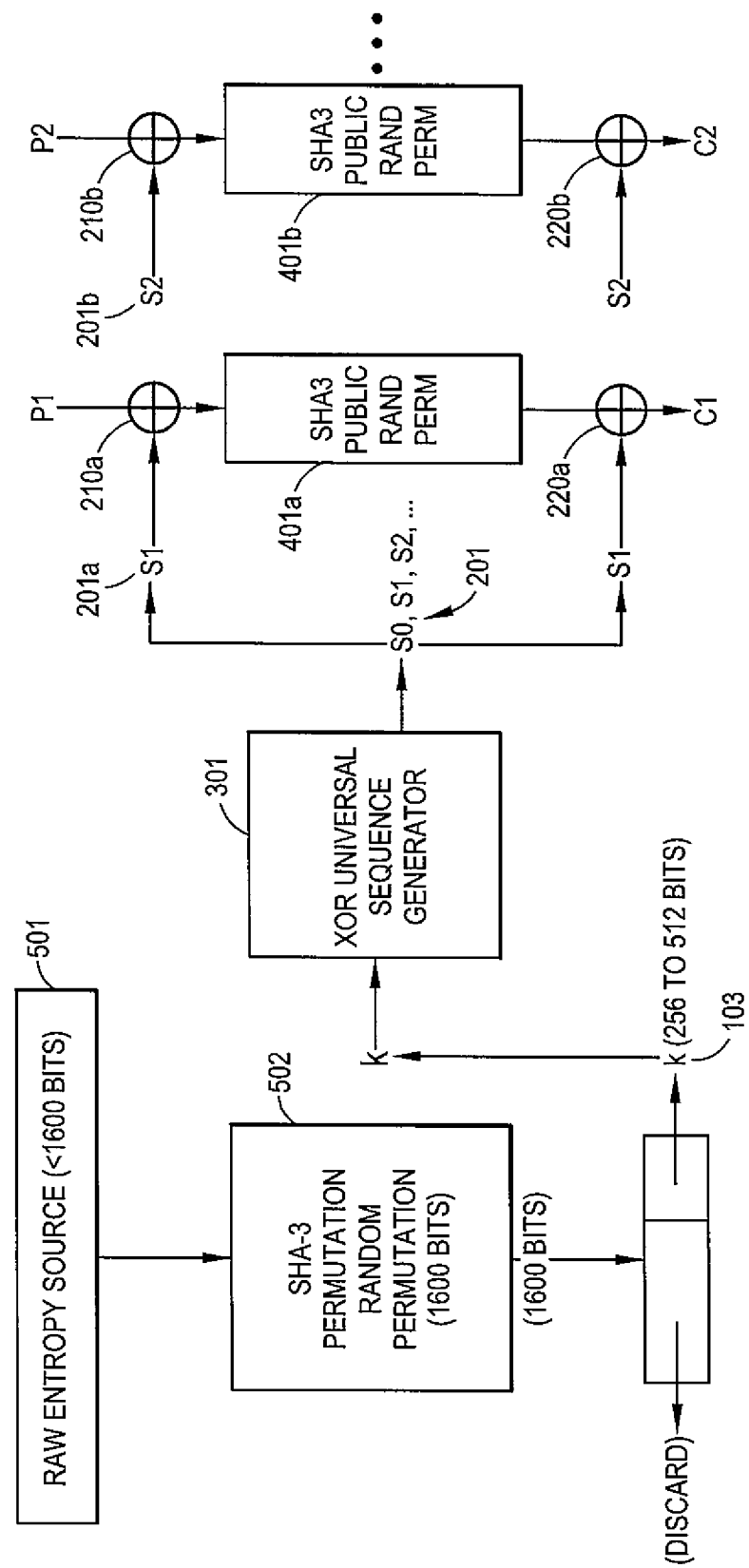
FIG. 8 describes IAPM (e.g., authenticated) encryption with key-derivation from a same SHA-3 public permutation.

While the scheme IAPM in FIG. 4 was shown to be secure even when using a public and keyless random permutation (as opposed to FIG. 2 where a keyed block cipher was used), it is not at all clear that the same public random permutation which is also used in the key derivation function can be re-used in the IAPM scheme. FIG. 8 (e.g., part of encryptor 101) describes the IAPM scheme along with the key derivation of FIG. 7 and shows that the same public random permutation (e.g., SHA-3's public random permutation) is used in both the key-derivation and the IAPM mode of (authenticated) encryption. Key derivation is performed by the technique in FIG. 7 to produce the key k 103. Key k 103 is passed through the XOR universal sequence generator 301 (see FIG. 3 too) to produce the whitening sequence S1 201a, S2 201b, . . . , Sn 201n. The whitening sequence S1 201a, S2 201b, . . . , Sn 201n is applied to the exemplary IAPM construction of FIG. 4, which uses a keyless random permutation.

Detailed security proofs have been obtained to demonstrate that this scheme remains secure (i.e., maintains secrecy of the plaintext in the ciphertext) even when the same public random permutation is used in both the key-derivation function and the IAPM-like schemes. Note that this applies to all sorts of key-derivation functions and authenticated encryption modes which are similar to IAPM.

Similar ideas also apply to authenticated encryption schemes like IAPM, or just plain authentication schemes like PMAC.

Referring to FIGS. 9A and 9B (collectively referred to as FIG. 9 herein), a logic flow diagram is shown for conducting encrypted communication using a public random permutation. FIG. 9 illustrates the operation of an exemplary method, a result of execution of computer program instructions embodied on a computer readable memory, functions performed by logic implemented in hardware, and/or interconnected means for performing functions in accordance with exemplary embodiments. It is assumed that the computer system 110, e.g., under control at least in part of the encryptor 101, performs the blocks in FIG. 9. Note that a similar logic flow diagram is easily made by those skilled in the art for decryption by the decryptor 102 and the computer system 120. Additional comments regarding decryption are also made below.

In block 905, the computer system 110 exchanges randomness with the computer system 120. In block 910, the computer system 110 derives a uniformly random key from the randomness and the computer system 110 in block 915 encrypts a multitude of blocks of plaintext using the uniformly random key to create a corresponding multitude of blocks of ciphertexts. The exchanging, deriving, and encrypting each uses the public random permutation. In block 917, the computer system 110 transmits the multitude of blocks of ciphertexts to the second computer system 120. The second computer system 102, using the decryptor 102, would perform another flow diagram and decrypt the ciphertexts.

Blocks 920-975 illustrate possible embodiments based off one or more of blocks 905, 910, 915 and 917. In block 920, both the deriving a uniformly random key (block 910) and the encrypting a multitude of blocks of plaintext (block 915) use a same public random permutation. In block 925, based off of block 920, the computer system 110, for deriving a uniformly random key from the randomness, splits the randomness into a multitude of blocks and iteratively applies the public random permutation to the multitude of blocks and to an intermediate result of the iterative application of the public random permutation. See FIG. 6. The iteratively applying produces an intermediate result for each iteration (as illustrated by outputs of public random permutations $601a, \ldots, 601m$) and the iterative application of the public random permutation uses the intermediate result and a current block for the public random permutation for all but a first iteration where only a first block is used for the public random permutation (see public random permutation $601a$). Block 930 is based off of block 925 and the computer system 110 has a result of a final application of the random permutation for a final iteration being divided into two pieces, wherein a first piece is not used (e.g., erased, discarded) and a second piece is output as the uniformly random key. See FIG. 7, where the 1600 bit output of the SHA-3 permutation 502 has a piece that is discarded and another piece (256 to 512 bits in an example) that is used as key k.

In block 935, which is based off of block 920, the computer system 110, for encrypting a multitude of blocks of plaintext, generates a whitening sequence from the uniformly random key. See, e.g., XOR universal sequence generator 301 of FIG. 8. In block 940, which depends from block 935, the computer system 110 applies an exclusive-or universal hash function (e.g., the XOR universal sequence generator 301 in FIG. 8) to the uniformly random key and an index number of a block of plaintext input from the multitude of plaintext blocks. See, e.g., Hugo Krawczyk, "LFSR-based Hashing and Authentication", Proc. Crypto 1994, LNCS 839, 1994; and C. S. Jutla, "Encryption Modes with Almost Free Message Integrity", Journal of Cryptology 21(4), 2008. See citation [16] below.

The computer system 110 for block 945 generates a whitening sequence by whitening each of the multitude of plaintext blocks with a corresponding element from the whitening sequence by using a bit-wise exclusive-or operation. See, e.g., XORs 210 from FIG. 8. In block 950, the computer system 110 for encrypting a multitude of blocks of plaintext applies the public random permutation to each of the multitude of whitened plaintext blocks. See, e.g., the SHA-3 public random permutations 101 of FIG. 8. In block 955, the computer system 110, for encrypting a multitude of blocks of plaintext, whitens each block of output of the public random permutation by the corresponding whitening sequence element using a bit-wise exclusive-or operation. See, e.g., the XORs 220 of FIG. 8.

In block 965, the public random permutation is the public random permutation of the SHA-3 hash function. This block references block 917 but could reference any previous block.

An authentication scheme generates an authentication tag using a secret key on a plaintext message, and the authentication tag and the accompanying plaintext message can be validated by anyone possessing the same secret key. The security guarantee is that only someone with possession of the secret key could have generated the authentication tag. The above methodology of using public random permutation, both for the generation of the authentication tag and the key derivation, is applicable also to purely authentication tag generating schemes. Similarly, it is also applicable to schemes which encrypt the payload and simultaneously generate an authentication tag (also known as authenticated encryption schemes).

Concerning an authentication scheme, blocks 970 and 975 (of FIG. 9B) are examples of this. The computer system 110, in block 970, simultaneously with encrypting, generates an authentication tag based on the multitude of blocks of plaintexts. Block 970 might be performed as follows. An authentication tag (for authentication purposes) can be generated by encrypting a last block (see block $601m$ in FIG. 6 for example), which comprises an XOR-sum of all the plaintext blocks (pre- and post-processed with its whitening block material as described above). Block 975 indicates that all of deriving a uniformly random key, encrypting a multitude of blocks of plaintext, and generating an authentication tag use a same public random permutation.

Figure 10:
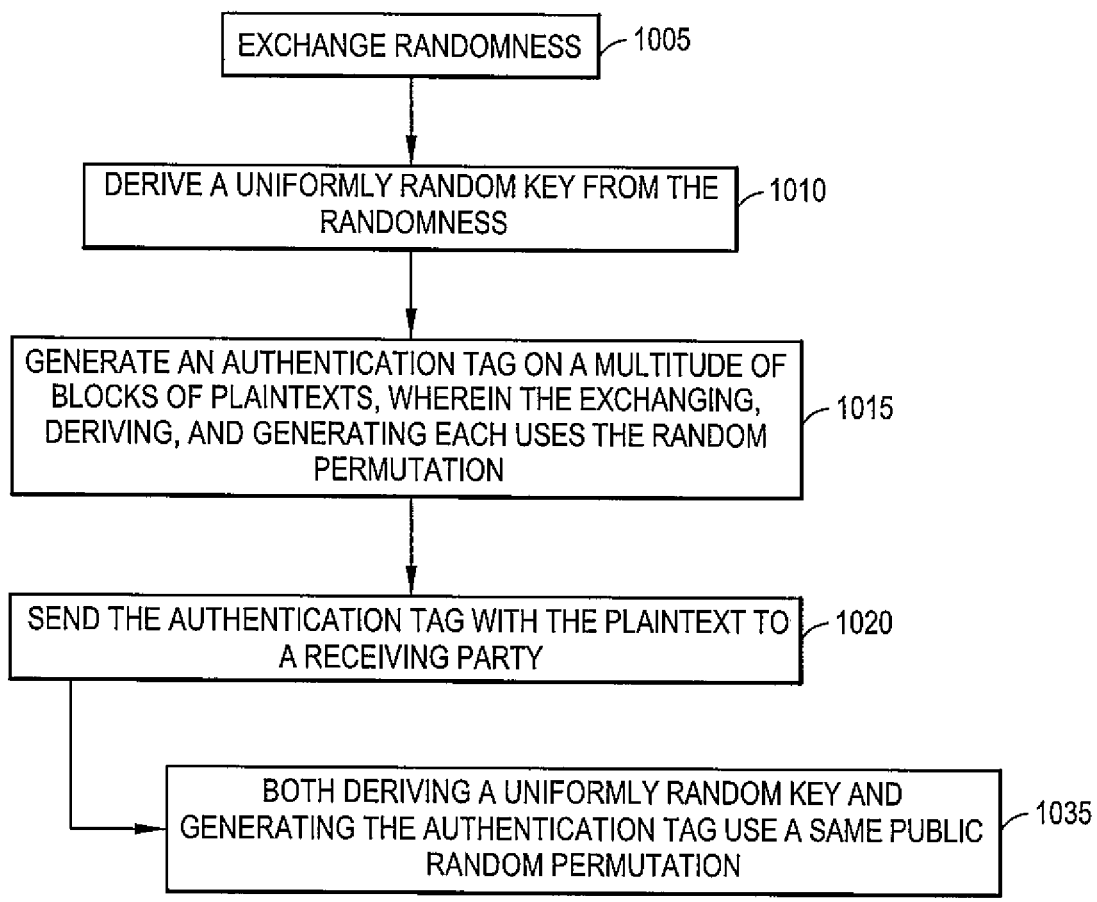
FIG. 10 is a logic flow diagram for authenticating a message using a public random permutation, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 10, FIG. 10 is a logic flow diagram for authenticating a message using a public random permutation, and illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 10 are assumed to be performed by the computer system 110, e.g., under control at least in part of the encryptor 101.

In block 1005, the computer system 110 the computer system 110 exchanges randomness with the computer system 120. In block 1010, the computer system 110 derives a uniformly random key from the randomness. The computer system 110, in block 1015 generates an authentication tag on a multitude of blocks of plaintexts. See block 970 for an example of a possible technique used for this. The exchanging, deriving, and generating each uses the public random permutation. In block 1020, the computer system 110 sends the authentication tag with the plaintext (e.g., the multitude of blocks of plaintext), as no encryption was performed, to a receiving party (e.g., the computer system 120 in this example). Only the plaintext is being authenticated. Similarly, the receiving party authenticates the incoming plaintext, by computing its own authentication tag and comparing with the incoming authentication tag.

Block 1035 is another example, where both deriving a uniformly random key and generating the authentication tag use a same public random permutation.

It is noted that the letter "n" as used above, e.g., in FIG. 4 for the keyless public random permutation 401 and the letter "m" as used above, e.g., in FIG. 6 for the public random permutation 601 are merely representations of a certain number of stages and are not to be limiting. They could be arbitrarily large.

The following description includes more information, including a detailed discussion of the mathematical basis for the above embodiments and also including different embodiments. For ease of reference, the following is divided into a number of sections. Also, although the description below may use the pronoun "we", the description below is the inventor's.

In brief, we propose instantiating the random permutation of the block-cipher mode of operation IAPM (Integrity-Aware Parallelizable Mode) with the public random permutation of Keccak, on which the draft standard SHA-3 is built. IAPM and the related mode OCB are single-pass highly parallelizable authenticated encryption modes, and while they were originally proven secure in the private random permutation model, Kurosawa has shown that they are also secure in the public random permutation model assuming the whitening keys are uniformly chosen with double the usual entropy. Below, we show a general composability result that shows that the whitening key can be obtained from the usual entropy source by a key derivation function which is itself built on Keccak. We stress that this does not follow directly from the usual indifferentiability of key derivation function constructions from Random Oracles. We also show that a simple and general construction, again employing Keccak, can also be used to make the IAPM scheme key-dependent-message. Finally, implementations on modern AMD-64 architecture supporting 128-bit SIMD instructions, and not supporting the native AES instructions, show that IAPM with Keccak runs three times faster than IAPM with AES.

1 Introduction

Symmetric key encryption of bulk data is usually performed using either a stream cipher or a block cipher. A long message is divided into small fixed-size blocks and encryption is performed by either a stream-cipher mode or a block-cipher mode employing a cryptographic primitive that operates on blocks. The stream-ciphers are by definition stateful, and hence do not allow random-access decryption. The block primitives have traditionally been keyed-primitives, i.e. the block primitives also take a secret key as input. However, stream-cipher modes are sometimes designed to work with key-less block primitives as the state itself can maintain or carry some secret information. Indeed, given a random oracle H [3], that takes arbitrarily long bit-strings as input and outputs arbitrarily long bit-strings, one can encrypt a message M under secret key k by choosing a distinct nonce or initial vector IV and generating the ciphertext as $\langle IV, H(k\|IV)\oplus M\rangle$. However, such arbitrary length random oracles are usually built using small fixed-length (input and output) random oracles or public random permutations which have undergone serious cryptanalysis and sometimes have provable resistance to certain known differential and linear attacks. Examples of such constructions are variants of Merkle-Damgard construction [11] and the sponge construction [5] proven secure under the strong notion of indifferentiability [18], which allows one to show that the encryption above is indeed secure.

Note that the only underlying assumption here is that the fixed-length (input and output) random oracle or permutation is indeed as good as picking such a function randomly from all such functions with the same domain and range. The random permutation is publicly available, yet it is deemed random enough in the sense that without actually computing the permutation P on x (such that x was not the output of an earlier computation of $P^{-1}(y)$ for some y), its value P(x) is random and un-predictable. Indeed, this is the model under which most cryptographic hash functions operate including SHA-2 [21] and SHA-3 [22] (the latter a draft standardization of Keccak [4]). We will refer to this as the public random permutation (RP) model. This should be contrasted with the private random permutation (RP) model, where the random permutation is not available to the public and it can only be accessed via an oracle, such as an encryption/decryption algorithm which is built on this private random permutation. As an example, the model contends that the AES [1] permutation keyed with a secret key becomes a private random permutation. However, note that it requires that two (or more) such instantiations with randomly and independently chosen keys lead to completely independent private random permutations.

This complication of the private random permutation model, and advances in designing good random permutations enjoying provable bounds on differential trails [1, 4], has led to many proposals of encryption schemes in the public random permutation model, but mostly still in the stream-cipher mode. For example, the Keccak team has proved that one can build authenticated-encryption stream-cipher modes using the very same public Keccak permutation [6] on which SHA-3 is built. The question naturally arises if one can build authenticated-encryption block-cipher modes of operation using the Keccak permutation in the public RP model.

In 2010, Kurosawa [17] showed that a modified version of the Integrity-aware Parallelizable Mode (IAPM) [14] authenticated encryption scheme is secure in the public RP model. Jutla in [14] had only shown that the IAPM scheme is secure in the private random permutation model (e.g. instantiating it with keyed-AES). The result of Kurosawa shows that one can instantiate it (or at least the slightly modified version) by a public random permutation, e.g. the key-less Keccak permutation. He also showed that the same applies to modified versions of OCB [20] which is a variant of IAPM that can also handle messages that are not of length exact multiples of block size. The main attraction of these schemes is that they provide single-pass authenticated-encryption, and in addition are fully-parallelizable. Essentially, both these properties were obtained in the private RP model by requiring two independent keys k1 and k2, the key k1 being say, the AES key, and k2 being a whitening key. The whitening key k2 is used to whiten the i-th block of input before encryption by AES under key k1, and also to whiten the output of the AES encryption in the same way. We will refer to this as pre- and post-whitening with k2. The whitening refers to obtaining n-bits of new randomness from k2 and i, and xor-ing it to the input block. The main idea here is that this randomness need only be pair-wise independent, which makes this a rather simple operation, e.g. a linear-feedback-shift-register operation (LFSR clocking).

The result of Kurosawa shows that one can get rid of the permutation key, i.e. k1 by say setting it to a constant, and the scheme is still secure for authenticated encryption (just by the pre- and post-whitening due to k2 using a pair-wise independent random function). This is then reminiscent of the Even-Mansour construction [13], except that it uses a pair-wise independent function of the key k2. Further, its security bound has terms similar to the Even-Mansour bound, namely $z*q*(2^{-n}+2^{-|k2|})$, where z is the number of encryption/decryption queries and q is the number of evaluations of the public permutation. Thus, as shown by Daemen [12], one must have large n, because of the "quadratic" nature of the bound. Thus, a 128-bit AES permutation (with a fixed key) is out of the question. However, this quadratic nature of the bound also applies to all the random oracle constructions mentioned above, and hence Keccak actually uses a permutation on n=1600 bits, in which case at least this concern goes away. We will refer to this version of IAPM that uses the key-less Keccak permutation as IAPM-Keccak.

However, once we are in the public random permutation model, there are other issues which need to be addressed, which are usually swept aside in the random permutation model by making various independence assumptions (most likely valid, but still not entirely satisfying). In the public random permutation model, such independence assumption are definitely not valid a priori, and one must prove that composition of various components of an end-to-end encryption paradigm, e.g. a secure channel, are secure, especially if they are all using the same public random permutation.

In particular, while one may make the benign assumption that the whitening key k2 is chosen uniformly at random from all 256-bit strings (this is the minimum width required for k2 because of the above quadratic bound so as to match security obtained in the private RP model), it most likely was obtained from a wider, less-uniform random source and with lesser min-entropy (say, 128-bits) using a key-derivation function. Most likely, this key-derivation function itself is built using the same public random permutation (Keccak of SHA-3).

Even if this key-derivation function is proven to be a random oracle in the indifferentiability sense, it does not prove that it can be composed "as is" with IAPM that is using the same key-less permutation Keccak. In fact, while [18] proves a composition theorem that says that a crypto system C can use an ideal primitive I, instead of an algorithm alg built using another public ideal primitive F, and still be equally secure, this composition theorem does not hold if C itself is using F (in our case F is the Keccak permutation). We defer detailed discussion to Section 5.

However, we prove that in some special situations of cryptosystems themselves accessing the public ideal primitive F a composition result still holds. This result should be of general interest, beyond application to using IAPM in the random permutation model. In particular, we show that using a key-derivation function that uses the Keccak permutation and is shown indifferentiable from a random oracle can indeed be securely used to generate the 256-bit uniformly random whitening key of IAPM-Keccak. The final security bound we obtain is of the form $q*2^{-128}+z*q*(2^{-n}+2^{-256})$. This matches the key-source security bound in the private RP model.

We also need to study security of secrecy under key-dependent message encryption (KDM-security) [7] as in the public RP model this could have ramifications usually ignored in the private RP model. Further, apart from security issues like accidental encryption of the key itself, KDM security can have other applications [7]. In the random oracle model [7], this also shows that the encryption scheme mentioned at the beginning of this introduction is KDM-secure, as long as the IV is a fresh uniformly random value of length equal to the security parameter. However, constructions of arbitrary output length random oracles from small fixed length random oracles or random permutations tend to be sequential or at best tree-like, and do not offer fully parallelization of IAPM. Further, while IAPM operates at full rate, i.e. rate of encryption of 1600 bits per invocation of Keccak permutation, the random oracle constructions have a lesser ratio than the bit-size of the permutation. Finally, IAPM provides authentication almost for free.

Fortunately, we show that a similar construction to [7] can be used to obtain KDM-security for IAPM. The main idea is to apply, for each message, a random oracle H on (k||IV) but only to obtain 256-bits of a fresh 256-bit whitening key k2. Then, this key k2 can be used to do the IAPM authenticated-encryption in the public RP model. It is a non-trivial task to prove that the same public random permutation can be used to build the random oracle H also. Our result is also general and applies to any crypto system that is chosen plaintext attack (CPA) secure in the public RP model. In particular, it also applies to IAPM in the private random permutation model (i.e. using keyed-AES). We also show, by our earlier composition theorem that the key k need not be the wider source from which the key is obtained, but an already extracted key k from the wider source k' using a random oracle, as long as the source is erased after extraction of k.

Finally, we prove that general IAPM like constructions, such as OCB and others which are based on pre- and post-whitening by pair-wise independent random numbers, are as secure in the public random permutation model as in the private random permutation model.

We also implement the KDM-secure IAPM scheme using the Keccak-1600 permutation and show that on modern Intel/AMD architectures supporting 128-bit SIMD operations (and not supporting native AES instructions) it runs at speeds 3 times faster than a similar IAPM scheme using keyed-AES.

2 Preliminaries

Throughout this paper, an algorithm will be called an N-oracle algorithm if it has access to N number of oracles. If it has only one oracle, we will just refer to it as an oracle algorithm.

Definition 1. (ε-XOR-Universal Hash Function) [16] For any finite set H, an H-keyed (m,n)-hash function H has signature $H:H\times\{0,1\}^m \rightarrow \{0,1\}^n$. Such a hash function is called an ε-XOR-Universal hash function, if for every m-bit value M, and every n-bit value c, $Pr_h[H(h,M)=c] \leq \varepsilon$, and further if for every pair of distinct m-bit values M1 and M2, and every n-bit value c, $Pr_h[H(h,M1) \oplus H(h,M2)=c] \leq \varepsilon$, where the probabilities are over choosing h uniformly from H.

Definition. For a random variable X defined on $\{0,1\}^n$, its min-entropy $H_\infty(X)$ is the minimum over all n-bit strings x of $\log(1/Pr_x[X=x])$.

3 Authenticated Encryption

We give definitions of authenticated encryption schemes in a public random permutation model. Let Coins be the set of infinite binary strings. Let $K \subseteq \{0,1\}^*$ be the key space, and D be a distribution on the key space.

Definition. A (2-oracle, probabilistic, symmetric, stateless) authenticated encryption scheme, with block size n, key space K, and distribution D, consists of the following:
  initialization: All parties exchange information over private lines to establish a private key $k \in K$. All parties store k in their respective private memories.
  message sending with integrity: Let E and D be efficient 2-oracle algorithms, with E taking as input a key k (in K), coins (in Coins), and a plaintext binary string and outputting a binary string, and D taking as input a key k and a ciphertext binary string and outputting either ⊥ or a binary string. The two oracles take n-bits as input and produce n-bits as output.

In addition E and D have the property that if oracles $O_1$ and $O_2$ implement inverse functions of each other, then for all k∈K, for all coins and P, $$D^{O_1,O_2}(k,(E^{O_1,O_2}(k,\text{coins},P))=P.$$

We will usually drop the random argument to E as well, and just think of E as a probabilistic algorithm. The security of such a scheme is given by the following two definitions, the first defining confidentiality under chosen plaintext attacks, and the second defining message integrity. In the security definitions, we will count the length of plaintext inputs in terms of n-bit blocks. Thus, a plaintext input of length in bits will be considered to have length $\lceil m/n \rceil$ blocks.

Definition. (Chosen-Plaintext Attack Security[2])

For any n>0, consider a 3-oracle probabilistic adversary A. Consider an authenticated encryption scheme with key-space K, key distribution D and 2-oracle algorithms E and D. For any n-bit permutation $\pi$, let $\text{Real}_k^\pi$ be the oracle that on input P returns $E^{\pi,\pi^{-1}}(k, P)$, and $\text{Ideal}_k^\pi$ be the oracle that on input P returns $E^{\pi,\pi^{-1}}(k,0^{|P|})$. The IND-CPA advantage $\text{Adv}_A$ of the adversary A in the public random permutation model is given by $$|Pr[k \leftarrow D; A^{\pi,\pi^{-1},\text{Real}_k^\pi} = 1] - Pr[k \leftarrow D; A^{\pi,\pi^{-1},\text{Ideal}_k^\pi} = 1]|,$$

where the probabilities are over choice of $\pi$ as a random permutation on n-bits, and choice of k according to D, other randomness used by E, and the probabilistic choices of A.

An authenticated encryption scheme with block size n is said to be $(t,q1,q2,m,\varepsilon)$-secure against chosen plaintext attack in the public random permutation model if for any adversary A as above which runs in time at most t and asks at most q1 queries to $\pi$ and $\pi^{-1}$, and at most q2 queries to the third oracle (these totaling at most m blocks), its advantage $\text{Adv}_A$ is at most $\varepsilon$.

Definition. (Message Integrity): Consider an adaptive 3-oracle (probabilistic) adversary A running in two stages. Adversary A has access to oracles $O_1$, $O_2$ and an encryption oracle $E^{O_1,O_2}(k,\bullet)$. In the first stage (find) A asks r queries of the encryption oracle. Let the oracle replies be $C^1, \ldots, C^r$. Subsequently in the second stage, A produces a cipher-text C', different from each $C^i$, i∈[1 . . . r]. The adversary's success probability is given by $$\text{Succ}_A \stackrel{def}{=} Pr[D^{\pi,\pi^{-1}}(k,C') \neq \bot],$$

where the probability is over choice of $O_1$ as a random permutation on n-bits (and $O_2$ as its inverse), and choice of k according to D, other randomness used by E, and the probabilistic choices of A.

An authenticated encryption scheme with block size n is $(t,q1,q2,m,\varepsilon)$-secure for message integrity in the public random permutation model if for any 3-oracle adversary A running in time at most t and making at most q1 queries to $O_1$ and $O_2$ and at most q2 queries to the encryption oracle (these totaling m blocks), its success probability is at most $\varepsilon$.

4 IAPM in Random Permutation Model

We will prove our results for more general (abstract) IAPM-like schemes, but to serve as a background we briefly review the definition of IAPM from [14, 15]. In the following, the operator "+" will stand for integer addition, and "⊕" for n-bit exclusive-or (xor). Since with wide permutations on n bits, the "MAC" tag produced by the permutation may need to be truncated, the authentication check in decryption is defined slightly differently (as in OCB [20] and [17]). In the following, when using n-bit permutations, we will refer to n-bit strings as a block.

Definition 2. Given a permutation f from n bits to n bits, an H-keyed (2n,n)-hash-function g, where H is the set of all v-bit strings (v≤n), the (deterministic) function e-iapm$_{f,g}$:H× $\{0,1\}^n \times (\{0,1\}^n)^* \to (\{0,1\}^n)^+$ is defined as follows:

Let the input to e-iapm$_{f,g}$ be h∈H, an n-bit (block) IV, and an m block string P $(=P_1, P_2, \ldots, P_m)$.

Define $C_0$=IV, and checksum=$0 \oplus \oplus_{j=1}^m P_j$.

Define for j=1 to m:

$C_j$=g(h,⟨IV,j⟩)⊕f($P_j \oplus$g(h,⟨IV,j⟩)).

$C_{m+1}$=g(h,⟨IV,0⟩)⊕f(checksum⊕g(h,⟨IV,m+1⟩)).

The output of the function e-iapm$_{f,g}$ is the m+2 block string $C_0, C_1, \ldots, C_{m+1}$. The last block can be truncated to the required "MAC" tag-length, say $\mu$ bits.

Definition 3. With the same parameters as above, the function d-iapm$_{f,g}$:H×$(\{0,1\}^n)^+ \to (\{0,1\}^n)^* \cup \{\bot\}$ is defined as follows:

Let the input to d-iapm$_{f,g}$ be an h∈H, an ((m+1)n+$\mu$)-bit string C, which is divided into (m+1) blocks IV, $C_1, \ldots, C_m$ and a tag T of $\mu$ bits.

Define for j=1 to m:

$P_j$=g(h,⟨IV,j⟩)⊕f$^{-1}$($C_j \oplus$g(h,⟨IV,j⟩)).

$T^*$=g(h,⟨IV,0⟩)⊕f($\oplus_{j=1}^m P_j \oplus$g(h,⟨IV,m+1⟩)).

if $(\text{trunc}_\mu(T^*) \neq T)$ return $\bot$, otherwise the output of d-iapm$_{f,g}$ is the m block string $P_1, \ldots, P_m$.

Figure 11:
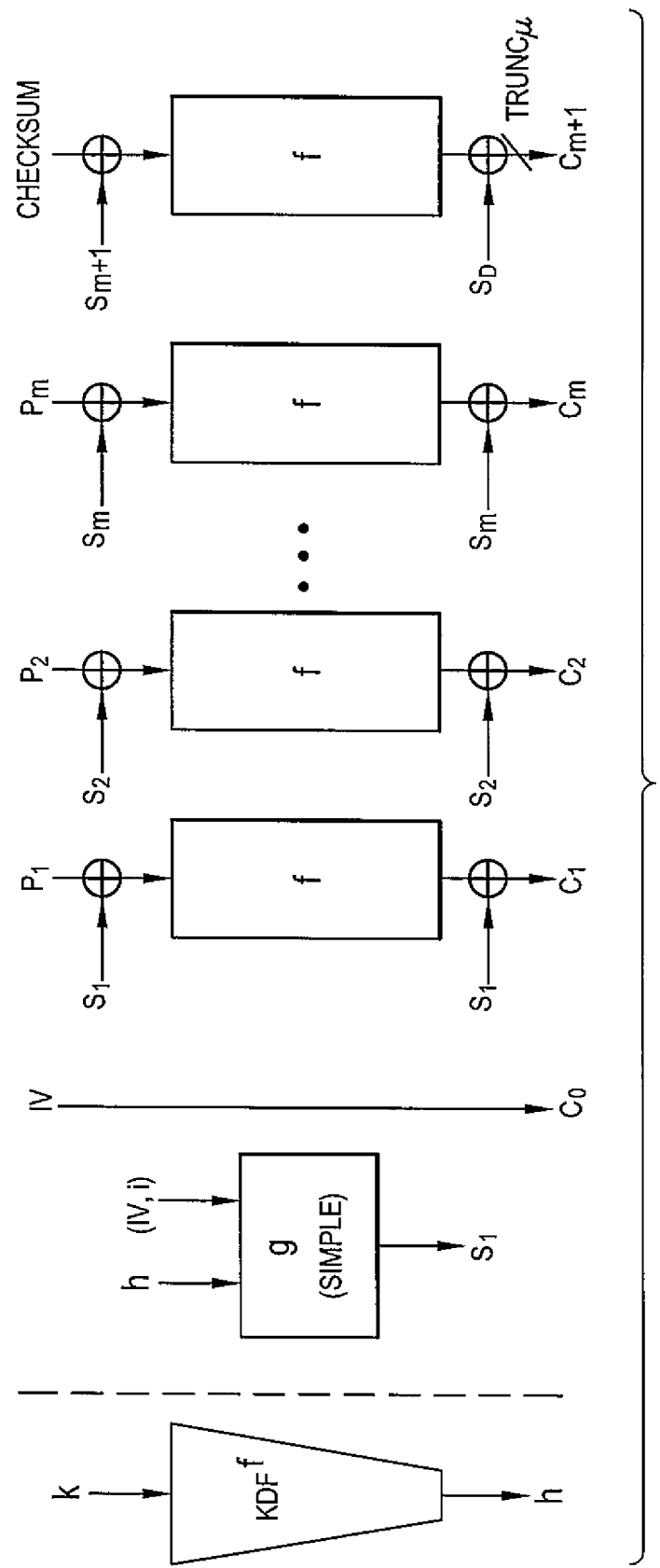
FIG. 11 is an illustration of IAPM in a public random permutation model.

See FIG. 11 (right of the dashed vertical line) for a schematic diagram. The left of the dashed line depicts key derivation using the same permutation, which is discussed in the next sub-section.

4.1 Public Random Permutation Model

If g is an efficiently computable function, the above two functions e-iapm and d-iapm can be computed efficiently given oracle access to f and f$^{-1}$. It is important to make this characterization as we intend to instantiate f and f$^{-1}$ by public permutations. Further, the definition of an (authenticated) encryption scheme requires specifying the distribution from which the keys are sampled. While we may assume a benign setting where the v-bit key h above is chosen uniformly from H, it is most likely that this key is obtained using a key-derivation function (KDF) which in turn also used the same public permutation f. Thus, we will define a composite scheme which takes an arbitrarily long bit-string k as (key) input, uses a general-purpose KDF (with oracle access to f and f$^{-1}$) to obtain h from k, and then uses e-iapm and d-iapm as per Definitions 2, 3 with parameter g and with oracle access to f and f$^{-1}$.

Definition 4. (IAPM in public random permutation model). See FIG. 11, left hand side of the dashed line. Let f be an n-bit permutation. Let g be an (efficiently computable) H-keyed (2n,n)-hash function, where H is the set of all v-bit strings (v≤n). Let kdf be an efficient (key-derivation) 2-oracle algorithm that takes arbitrary bit strings as input and produces v-bit strings as output. The authenticated encryption scheme IAPM(kdf, g, v, $\mu$, $\kappa$) with block size n, and oracles f and f$^{-1}$ is given by the following key space, distribution, and 2-oracle encryption and decryption algorithms:

The set K of keys is arbitrary bit strings. The distribution D on K is any distribution on K with min-entropy $\kappa$.

Let h=kdf$^{f,f^{-1}}$(k).

The encryption under key k is given by e-iapm$_g^{f,f^{-1}}$(h,•,•), and the decryption by d-iapm$_g^{f,f^{-1}}$(h,•).

It is easy to see that the decryption algorithm correctly inverts the encryption algorithm.

In Section 5.1 we prove a general composition result for application of key-derivation functions, and using that it will follow that all security properties related to the above composite scheme can be reduced to related security properties of the following IAPM scheme with uniformly chosen keys.

Definition 5. (IAPM with uniform keys in public RP model) Authenticated Encryption scheme IAPM-uniform $(g,v,\mu)$ with block size n, and oracle f and $f^{-1}$ is given by a key space K that is the set of v-bit strings, and a distribution D on keys that is the uniform distribution on K. Moreover, the encryption and decryption algorithms under key k are given by e-iapm$_g^{f,f^{-1}}$(k,•,•), and d-iapm$_g^{f,f^{-1}}$(k,•) resp.

Definition 6. (Zero-IV IAPM) An IAPM scheme is called a zero-IV scheme if IV is always set to zero. Thus, $C_0=0$ for all ciphertexts, and g function is computed with IV set to zero. As a consequence, the encryption function does not need the IV input.

5 Indifferentiability

In this section we briefly discuss the notion of indifferentiability introduced by Maurer et al [18] based on ideas of universal composability (UC) [9] and the model described in [19]. We refer the reader to [18, 11] for details.

A cryptosystem C is modeled as an interactive algorithm (or Turing Machine), and it is run by an environment E. The cryptosystem C has a private interface $C^{priv}$ to the environment E and a public interface $C^{pub}$ to the adversary. The environment also controls the adversary. An ideal primitive is a cryptosystem whose interface just serves queries with answers. In this work, we focus on the notion of a public ideal primitive that has only a single interface which serves as both public and private interfaces. An important public ideal primitive is a random oracle (RO) which provides a random output to each query with the constraint that identical queries are replied with the same answer. We will refer to a random oracle that outputs exactly m-bits as an m-bit RO. Note that the input to an m-bit RO can be an arbitrarily long string.

Definition 7. An oracle algorithm alg with its oracle instantiated by an ideal primitive F is said to be $(t_D, t_S, q1, q2, L, \varepsilon)$-indifferentiable from a public ideal primitive I if there exists an oracle algorithm (called simulator) S that runs in time $t_S$ and makes at most L oracle calls, and such that for any (2-oracle) distinguisher D the following holds:

$$|Pr[D^{alg^F,F}=1]-Pr[D^{I,S^I}=1]|<\varepsilon,$$

where D runs in time $t_D$ and makes at most q1 (q2) calls to the first oracle (second oracle resp.). When the above property holds regardless of the run-time of D, we will say that alg$^F$ is $(\infty,t_S,q1,q2,L,\varepsilon)$-indifferentiable from I.

Readers more familiar with the UC framework will note that the above is equivalent to saying that the public ideal functionality I is UC-realizable by alg in the F-hybrid model.

Figure 12:
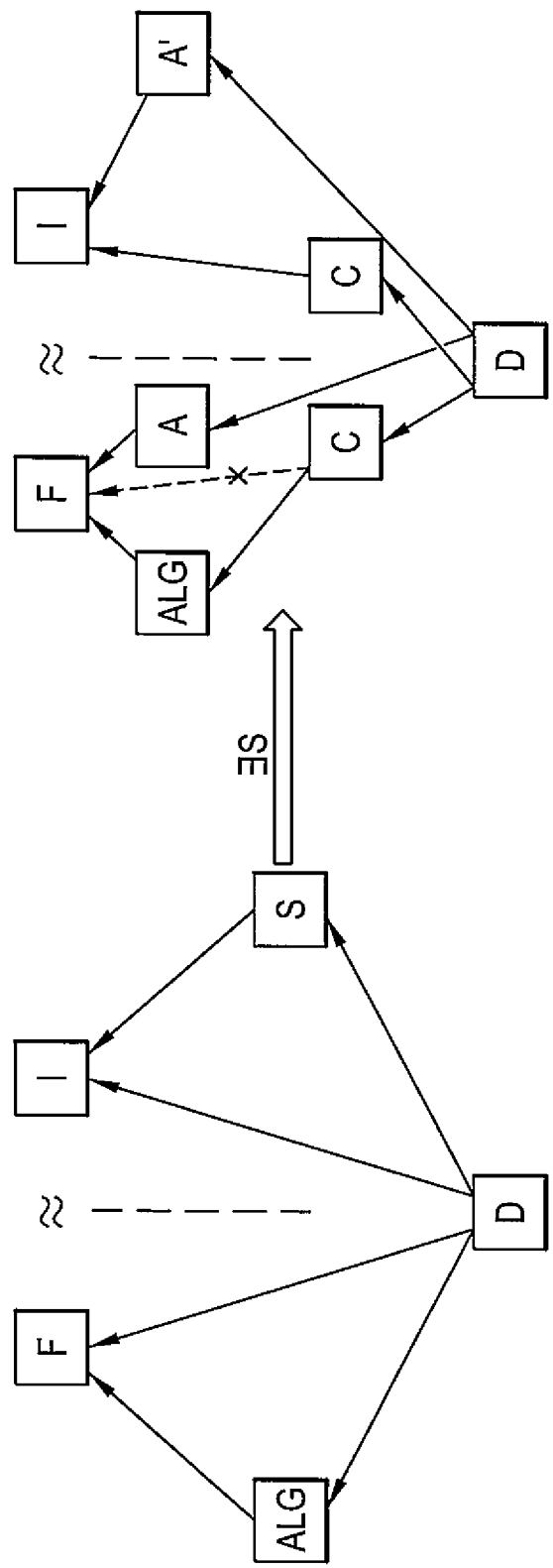
FIG. 12 is an illustration of indifferentiability and a composition theorem.

When composing cryptosystems, it is important to note that if a cryptosystem C uses a cryptosystem P then the public interface of C includes the public interface of P. One of the main results of [18] proves a composition theorem (see FIG. 12, which is an illustration of indifferentiability and a composition theorem, e.g., a representation made of what the results of [18] are) which informally states that if an oracle algorithm alg with oracle access to a public ideal primitive F is indifferentiable from a public ideal primitive I, then a cryptosystem C using alg$^F$ (with adversary having access to F by the above convention) is as secure as the cryptosystem C using I (with adversary having access to I).

However, if C itself accesses the public ideal primitive F, then this composition theorem may not hold in general. In fact, C needs its oracle instantiated by either F or some other public ideal primitive in the cii-world as well. In this situation, for the composition theorem to hold in general it is well known that in the definition of indifferentiability the distinguisher may need access to the same primitive F in both worlds [10]. This, of course, would preclude programming of F using the simulator S.

However, we show that in some special situations of cryptosystems themselves accessing the public ideal primitive a composition result still holds. For the next definition, we will focus on cryptosystems that are themselves ideal primitives and further they use another public ideal primitive, say F, as an oracle. Thus, the public interface of the former primitive is also F. We now delineate the definition of "as secure as" [18] to cater to such cryptosystems.

Definition 8. For public ideal primitives $F_1$ and $F_2$, a cryptosystem $C_1^{F_1}$ is said to be $(q1,q2,N,1-\varepsilon)$ as secure as a cryptosystem $C_2^{F_2}$ if for all environments E the following holds: for all adversary $A_1$ making at most a total of q1 oracle calls there is an adversary $A_2$ making at most a total of q2 oracle calls such that $$|Pr[E(C_1^{F_1},A_1^{F_1})=1]-Pr[E(C_2^{F_2},A_2^{F_2})=1]|<\varepsilon,$$

where both probabilities are conditioned on the total number of calls to $F_1$ ($F_2$ resp.) by $C_1$ and $A_1$ combined (by $C_2$ and $A_2$ combined resp.) being less than N.

5.1 KDF Composition

Definition. We will say that a cryptosystem C has an initialization step init, if C can be split into two parts init and C*. Further, over all calls from E to C, only the first call leads to execution of init and which results in a private state $\sigma$ The private state $\sigma$ is used as an additional input by C* in all calls from E to C.

Theorem 1. Let kdf be an oracle algorithm such that with its oracle instantiated with a public ideal primitive $\pi$, it is $(\infty,t_S,q_1,q_2,L,\varepsilon)$-indifferentiable from an m-bit RO. Let $C_1$ be a 1-oracle cryptosystem that has an initialization step that generates a private state by sampling in uniformly random bits. Let D be any distribution on finite length binary strings with min-entropy v. Let C be a cryptosystem which is identical to $C_1$ except that the initialization step is different and consists of running kdf on an input sampled from D, with the oracle calls of kdf redirected to the oracle of $C_1$. The private state of the initialization step is the output of kdf. Then, for all $q_3$, and for all $(q_3 \leq)N<q_2$, cryptosystem $C^\pi$ is $(q_3,q_3,N,1-L*N*2^{-v}-2*\varepsilon)$ as secure as cryptosystem $C_1^\pi$.

Figure 13:
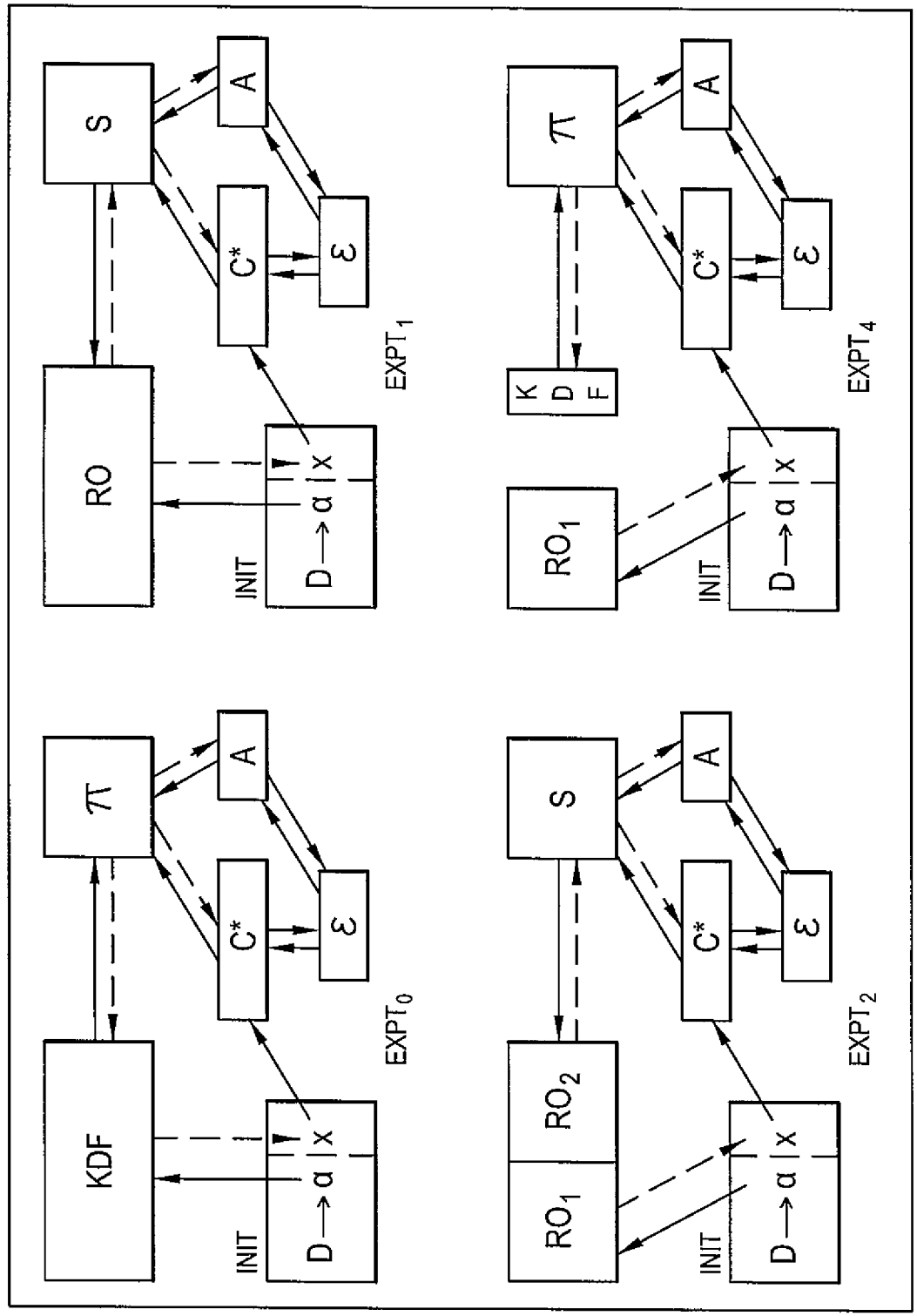
FIG. 13 illustrates a cryptosystem initialized using KDF, shows dashed arrows indicating oracle responses, and illustrates various experiments in Theorem 1.

Remark 1. The cryptosystem C is depicted in FIG. 13 (see, e.g., $Expt_0$ of FIG. 13). It is important to note that $\pi$ is a public ideal primitive, and when proving security the adversary is allowed access to $\pi$. The cryptosystem $C_1$ can be seen represented in $Expt_4$ of FIG. 13, which illustrates various experiments in Theorem 1. FIG. 13 illustrates a cryptosystem initialized using KDF, shows dashed arrows indicating oracle responses, and illustrates various experiments in Theorem 1.

Remark 2. In most known realizations of RO such as the sponge construction [5], the simulator S makes at most L=1 oracle calls.

Proof. Let E be any environment. Note that the public interfaces of C and $C_1$ include the interface of public ideal primitive $\pi$. Let $C_1$ consist of an initialization phase of sampling a uniformly random m-bit string r and a second 1-oracle phase C* running with additional input r. Let Ψ be a 2-oracle cryptosystem with oracles $O_1$ and $O_2$, with an initialization phase that samples a from D, queries $O_1$ with a to get x and runs the 1-oracle second phase C* with additional input x and oracle $O_2$. Note that $\Psi$ makes at most one call to the first oracle $O_1$. Moreover, if the two oracles of $\Psi$ are instantiated by $O_1=kdf^\pi$ and $O_2=\pi$, then we get the cryptosystem $C^\pi$ (see FIG. 13).

For any adversary A, consider a composite 2-oracle algorithm D that is a composition of E, the 1-oracle adversary A and $\Psi$ as defined above. The oracle calls of 2-oracle $\Psi$ are directed to the two oracles of D respectively, and the oracle calls of the 1-oracle A are directed to the second oracle of D. The algorithm D also outputs a single bit which is same as the bit output by E. Now consider two worlds: a real world where the first oracle is instantiated by $kdf^\pi$ and the second oracle by $\pi$, and an ideal world where the first oracle of D is instantiated by an m-bit RO and the the second oracle by S (which itself has oracle access to the same m-bit RO). Here S is the simulator as stipulated in the indifferentiability hypothesis of $kdf^\pi$ and m-bit RO. More formally, we will say that D is taking part in the real world experiment or the ideal world experiment. The real and the ideal world experiments will also be denoted by $Expt_0$ and $Expt_1$ respectively (see FIG. 14). We will denote probabilities in $Expt_i$ by a subscript i. Let N be any number less than $q_2$. Note that the total number of calls to the second oracle of D is the sum of the total number of calls of $\Psi$ to its second oracle and the total number of calls of A to its oracle. By the indifferentiability hypothesis, and conditioned on D making at most $N(<q_2)$ calls to the second oracle, the algorithm D cannot distinguish between the real world experiment and the ideal world experiment with probability more than $\varepsilon$. In other words, $|Pr_0[D=1]-Pr_1[D=1]| \le \varepsilon$.

Let BAD be the event that in $Expt_1$, the simulator S makes a call to its oracle (the m-bit RO) which is identical to the single call made to the first oracle by D. Recall, in $Expt_1$ the first oracle of D is same as the m-bit RO oracle of S. Now, the probability of D outputting 1 in $Expt_1$ is at most the sum of the following two values: (a) the probability of D outputting 1 and event BAD not happening, and (b) the probability of event BAD happening. Thus, $Pr_1[D=1 \wedge \neg BAD] \le Pr_1[D=1] \le Pr_1[D=1 \wedge \neg BAD]+Pr_1[BAD]$.

Figure 14:
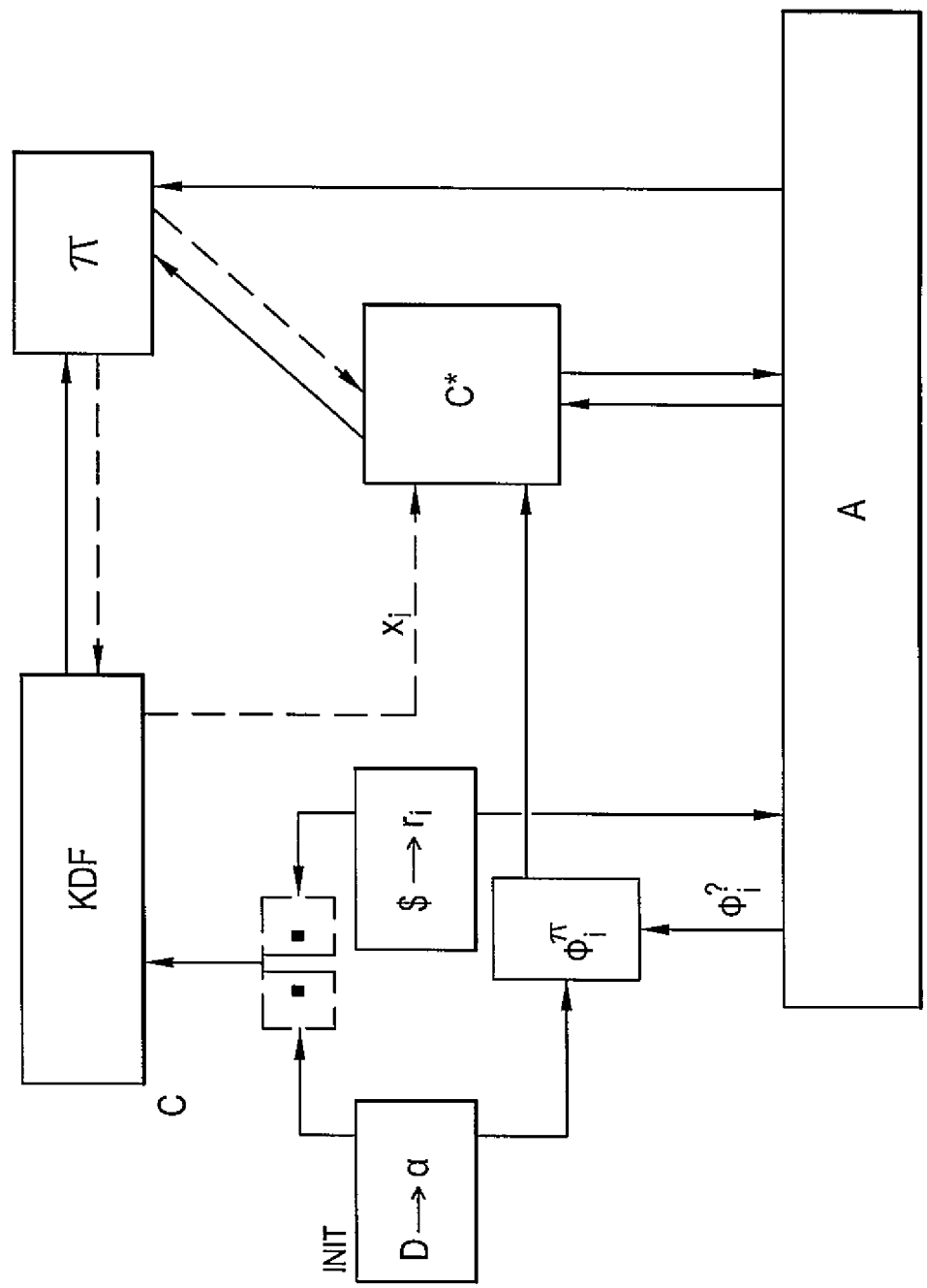
FIG. 14 illustrates a KDM secure general construction in a public RP model.

Now, consider another experiment $Expt_2$ (see FIG. 14) which differs from the ideal world experiment $Expt_1$ in that the common m-bit RO oracle of S and D is replaced by two independent m-bit random oracles $RO_1$ and $RO_2$ ($RO_1$ for the first oracle of D and $RO_2$ for the oracle of S; see FIG. 14).

From the definition of a random oracle, i.e. the fact that the oracle outputs random and independent values on different inputs, it is not difficult to see that the first probability (a) remains same in $Expt_2$ as in $Expt_1$. More formally, this is proved by induction over a sequence of hybrid games, starting from $Expt_1$ and ending in $Expt_2$, where in each subsequent game one additional call of S to its oracle (going backward from last call to first) is made to the new independent m-bit random oracle $RO_2$. Thus, $Pr_2[D=1 \wedge \neg BAD] \le Pr_1[D=1] \le Pr_2[D=1 \wedge \neg BAD]+Pr_1[BAD]$.

Now, consider experiment $Expt_3$ which is same as experiment $Expt_2$ except that the single call to the first oracle is replaced by just generating a uniform m-bit random value independently. This is just a syntactic change by definition of m-bit RO, and hence the probability (a) remains the same. Since the first oracle call does not access any m-bit RO, the m-bit RO oracle of S is the only RO that remains in $Expt_3$. Thus the above inequalities continue to hold with subscript 2 replaced by 3. It also follows that $Pr_3[D=1]-Pr_3[BAD] \le Pr_1[D=1] \le Pr_3[D=1]+Pr_1[BAD]$.

Next, consider $Expt_4$ which is same as $Expt_3$ except that the second oracle of D is instantiated by primitive $\pi$. Again, by the indifferentiability hypothesis of $kdf^\pi$ and m-bit RO, the probability $Pr_3[D=1]$ differs from $Pr_4[D=1]$ by at most $\varepsilon$. Now, note that experiment $Expt_4$ is identical to E running $C_1^\pi$ and adversary $A^\pi$. Since D outputs the same bit that is output by E it follows that $|Pr_4[E(\ )=1]-Pr_0[E(\ )=1]| \le 2*\varepsilon + \max\{Pr_1[BAD],Pr_2[BAD]\}$.

Since in both $Expt_1$ and $Expt_2$, the value x is independent of a (by definition of random oracle), it follows that all oracle calls of simulator S in both $Expt_1$ and $Expt_2$ are independent of a. Moreover, for each invocation of S, S itself makes at most L oracle calls. Since D has min-entropy $v$, it follows by union bound that both $Pr_1[BAD]$ and $Pr_2[BAD]$, conditioned on total number of calls to the second oracle being less than N, are upper bounded by $L*N*2^{-v}$ and that completes the proof.

6 Key-Dependent Message Security

In this section we show that IAPM in public RP model (Def. 4) can be slightly modified by introducing a random nonce so that it even becomes key-dependent message (KDM) secure. KDM security was introduced and formalized in [7], extending the notion of circular security from [8]. Informally, KDM security means that an Adversary cannot distinguish between an encryption of some function $\phi$ of the key itself from encryption of a constant message. The function $\phi$ is also allowed to be picked by the adversary adaptively.

6.1 KDM Security Definition

In this work, we will follow the definition of KDM security from [7] in the random oracle model, and adapt it to the public RP model, but will focus on a single key instead of a set of keys. One interesting feature of this definition is that the Adversary can ask for encryptions of the key under any function $\phi$ of its choice, and even a function $\phi$ whose description is given by an oracle algorithm with the oracle to be instantiated by the very same public random permutation.

In the following, we will restrict the Adversary's choice of oracle algorithms $\phi$ to fixed-length algorithms, i.e. for all oracles $\pi$, $|\phi^\pi(k)|$ is same for all k.

Definition. (Key-Dependent Message Security) For any n>0, consider a 3-oracle probabilistic adversary A. Consider an (authenticated) encryption scheme with key-space K, key distribution D and 2-oracle algorithms E and D. For any n-bit permutation $\pi$, Let $Real_k^\pi$ be the oracle that on input a description of a 2-oracle fixed-length algorithm $\phi$ returns $E^{\pi,\pi^{-1}}(k,\phi^{\pi,\pi^{-1}}(k))$, and $Ideal_k^\pi$ be the oracle that on input P returns $E^{\pi,\pi^{-1}}(k, zero)$, where zero is a bit-string of zeroes of length $|\phi^{\pi,\pi^{-1}}(k)|$. The IND-KDM advantage $Adv_A^{kdm}$ of the adversary A in the public random permutation model is given by $$\left|Pr[k \leftarrow D; A^{\pi,\pi^{-1},Real_k^\pi}=1] - Pr[k \leftarrow D; A^{\pi,\pi^{-1},Ideal_k^\pi}=1]\right|,$$

where the probabilities are over choice of $\pi$ as a random permutation on n-bits, and choice of k according to D, other randomness used by E, and the probabilistic choices of A.

An (authenticated) encryption scheme with block size n is said to be $(t,q1,q2,t3,q3,m,\varepsilon)$-secure against key-dependent message attack in the public random permutation model if for any adversary A as above that restricts its queries to description of 2-oracle algorithms $\phi$ that run in time t3 and make at most q3 oracle calls, and which itself (i.e. A) runs in time at most t and asks at most q1 queries to $\pi$ and $\pi^{-1}$, and at most q2 queries to the third oracle (these totaling at most m blocks), its advantage $Adv_A^{kdm}$ is at most $\varepsilon$.

6.2 General Construction

Definition 9. Let C* be a 2-oracle stateless authenticated encryption scheme with block size n, with key space K* and distribution D* on K* given by uniform distribution on all ν-bit strings, and encryption and decryption algorithms E* and D*. Let kdf be an efficient (key-derivation) 2-oracle algorithm that takes arbitrary bit strings as input and produces ν-bit strings as output. Then, define another 2-oracle stateless probabilistic authenticated encryption scheme C with block size n as follows (let $O_1$ and $O_2$ be its oracles):

The set K of keys is arbitrary bit strings. The distribution D on K is any distribution on K with min-entropy κ.

The probabilistic encryption algorithm under key a, takes input P, chooses ρ-bit r uniformly at random, obtains $x = kdf^{O_1, O_2}(a\|r)$, and outputs $\langle r, E^{*O_1, O_2}(x, P)\rangle$.

The decryption algorithm under key a, takes as input $\langle r, C \rangle$, obtains $x = kdf^{O_1, O_2}(a\|r)$, and outputs $D^{*O_1, O_2}(x, C)$.

Theorem 2. Let C* as above be $(t, q1, q2=1, m, \varepsilon_1)$-secure against chosen plaintext attacks in the public random permutation model. Let β be such that. For each l (n-bit) block plaintext input, β*l is the maximum number of calls that E* makes to its oracles. Let kdf as above with its oracle instantiated with a public random permutation on n bits be $(\infty, t_S, q3, q4, L, \varepsilon_2)$-indifferentiable from a ν-bit RO. Then, the authenticated encryption scheme C as defined above is $(t', q1', q2', t_3', q3', m, \delta)$ KDM-secure in the public random permutation model, for $t' + t_{3'} + (q1' + q3')^* t_S < t$, and $\beta^* m + q1' + q3' < q4$, and where $\delta = 4^* \varepsilon_2 + 2^* \varepsilon_1 + (\beta^* m + q1' + q3')^* L^* (q2'^* 2^{-\rho} + 2^{-\kappa})$.

Remark 3. For authenticated encryption schemes such as IAPM, β is at most 2. Moreover, for most ν-bit RO constructions such as the sponge construction L is at most 1. Also, note that in the theorem statement C* is required to be only single-use secure, i.e. q2=1 or only one encryption query is allowed. Informally, this suffices as the encryption key x for C* is obtained as x=kdf(a||r), for a fresh r for each message.

Proof: We will focus on the proof for a single encryption query by the Adversary A. Proof for multiple queries follows by induction by considering hybrid experiments. See FIG. 14 for a depiction of this setting along with the construction of C. We will denote both the public random permutation and its inverse as a single public ideal primitive π which offers both interfaces.

The real world experiment where encryption of φ(a) is returned will be called $Expt_0$. We will define a sequence of experiments, with the last being the one in which a constant string is encrypted. We will show that in each subsequent experiment, the probability of A outputting 1 is only negligibly different from the previous experiment.

In $Expt_1$, we replace kdf and π by ν-bit RO and the simulator S as stipulated in the indifferentiability of kdf from ν-bit RO. By the indifferentiability claim the difference in the probability of A outputting 1 is at most $\varepsilon_2$. We will use subscript i to denote probabilities in experiment $Expt_i$. This $|Pr_1[A=1] - Pr_0[A=1]| \le \varepsilon_2$.

Let BAD be the event that in $Expt_1$, the simulator S makes a call to its oracle (the ν-bit RO) which is identical to the (single) call made to the ν-bit RO by C, i.e. (a||r), where r is a ρ-bit uniform and independent random value. Now, $Pr_1[A=1]$ is at most the sum of $Pr_1[A=1 \wedge \neg BAD]$ and $Pr_1[BAD]$.

Now, consider experiment $Expt_2$ where we split the RO into two independent random oracles $RO_1$ and $RO_2$, where the call (a||r) is served by $RO_1$ and all calls by S are served by $RO_2$. This is similar to the situation depicted in $Expt_2$ in FIG. 14. It is clear that $Pr_2[A=1 \wedge \neg BAD]$ remains same as in $Expt_1$.

We, also consider $Expt_3$ where the call (a||r) to $RO_1$ is replaced by just using a random and independent ν bit value x. By definition of RO, this is same as $Expt_2$.

Next, we switch to $Expt_4$ where we go back to kdf and public random permutation π, except that there is no call to the kdf now (similar to as shown in $Expt_4$ in FIG. 13). Now, note that the encryption of φ(a) is being performed under a key x, which is a ν-bit uniformly random value independent of all other variables including a and r. Thus, by CPA security of C*, we can consider $Expt_5$ where we replace the encryption of φ(a) by a constant string of the same length, and the Adversary will not be able to distinguish with probability more than $\varepsilon_1$. Thus, similar to proof of theorem 1, $|Pr_5[A( )=1] - Pr_0[A( )=1]| \le 2^*\varepsilon_2 + \varepsilon_1 + \max\{Pr_1[BAD], Pr_2[BAD]\}$.

We now bound both $Pr_1[BAD]$ and $Pr_2[BAD]$. We first focus on the former. First note that r is only revealed to the Adversary A at the end of encryption by C*, while C* runs independent of r. Thus, all calls by C* to S are independent of r, and similarly all calls by A to S before C outputs r are independent of r. Thus the probability of any of these calls leading to event BAD is at most $L^*2^{-\rho}$ (recall, L is the maximum number of calls by S to RO in any invocation of S). Let there be a total of q' such calls to S.

So, we now focus on calls by A to S after r is output by C to A. Let there be q" such calls. We will also split BAD as a disjunction of BAD' and BAD", where BAD' is BAD restricted to the q' calls above, and BAD" is conjunction of BAD' not happening and BAD restricted to the q" calls of the latter kind. Consider the i-th such call by A to S. We can write BAD" as a disjunction of $(COL_i \wedge \neg BAD' \wedge \forall j < i: \neg COL_j)$ with i ranging from 1 to q", where $COL_i$ stands for collision in oracle calls of S with (a||r) in A's i-th invocation of S. Further, since these q" disjuncts are mutually exclusive, the probability of BAD" is exactly the sum of the probability of each disjunct. We will refer to each disjunct as $BAD''_i$. We now show that $Pr_1[BAD''_i] = Pr_2[BAD''_i]$. Since the view of the adversary A at the point it makes the i-th call is completely determined by earlier calls of A to S and all calls of C*, and given that the $Expt_1$ and $Expt_2$ are identically distributed till that point conditioned on $BAD' \wedge \forall j < i \neg COL_j$, the claim follows.

Again, since the events $BAD''_i$ are mutually exclusive, we get $Pr_1[BAD''] = Pr_2[BAD'']$. Now, $Pr_2[BAD'']$ is easier to upper bound, as we now show. First note that $Pr_2[BAD''] = Pr_3[BAD'']$, as the two experiments $Expt_2$ and $Expt_3$ are identically distributed.

Recall, in $Expt_3$, S is a simulator stipulated for each distinguisher in the indifferentiability claim, and thus it is defined given A, A and C*. It may also be a probabilistic algorithm. However, for fixed algorithms C*, A and A, it is also a fixed probabilistic algorithm.

Now, consider a 2-oracle distinguisher D which is built as follows by also using the uninstantiated 1-oracle S as a component (not to be confused with it being used as an oracle). The distinguisher D consists of composition of the 2-oracle C and 1-oracle A as in $Expt_3$, except for the following change: for each of the i∈[1 ... q"] calls of A to its oracle, it also uses S internally to see if S's L oracle calls collide with (a∥r). Finally, the distinguisher D outputs 1 iff (if and only if) event BAD" happens, with its two oracles instantiate by RO and $S^{RO}$.

Now by indifferentiability of $kdf^\pi$ and $\pi$ from RO and $S^{RO}$, the above probability of D outputting 1 remains same if we go back to using $kdf^{pi}$ and $\pi$ as the two oracles of D.

Next, consider D' which is same as D but replaces the encryption of $\phi(a)$ by C* by a constant string of the same length. Since in D and D', C* is using a random and independent v-bit value as key (i.e. independent of a), by CPA-security of C*, $|Pr[D=1]-Pr[D'=1]|<\varepsilon_1$.

Since as component of D', the view of A is independent of a, the probability of D'=1 is at most $q''*L*2^{-\kappa}$, recalling that the min-entropy of a (or its distribution D) is $\kappa$.

Thus, $Pr_2[BAD"]=Pr_4[BAD"]<\varepsilon_1+q''*(L*2^{-\kappa})$. Hence $Pr_1[BAD]\le 2*\varepsilon_2+\varepsilon_1+q''*L*2^{-\rho}+q''*L*2^{-\kappa}$.

7 Public to Private RP Model

In this section we show that the cryptosystem IAPM-uniform in the public random permutation (RP) model is as secure as the cryptosystem IAPM-uniform in the private random permutation model. Recall that in the public RP model, the adversary has access to oracles f and $f^{-1}$ which the IAPM scheme uses. Security is proven under the probability of choosing f uniformly from all random permutations on n bits, where n is the block size of the IAPM scheme. In the private RP model, the adversary does not have access to either f or $f^{-1}$.

Theorem 3. Let g be any $\varepsilon$-xor-universal hash function from 2n bits to n bits. The cryptosystem IAPM-uniform(g, v, µ) in the n-bit public random permutation model is (q, q, N, $1-q*2^{-n}-(2*q*N+N(N+1))*\varepsilon$) as secure as the cryptosystem IAPM-uniform(g,v,µ) in the n-bit private random permutation model, if the environment makes at most one call to the decryption algorithm.

Remark 4. Since all invocations of f and $f^{-1}$ in both e-iapm$_{f,g}$ and d-iapm$_{f,g}$ are "guarded" by xor-universal whitening function g keyed with secret key h, it would seem that it is easy matter to show that adversarial calls to f and $f^{-1}$ do not collide with such calls from IAPM. However, the adversary has access to the ciphertexts from the various calls the environment makes to IAPM, and it needs to be shown that the adversary gains only negligible information about the secret key h from the adaptively obtained ciphertext transcripts.

Remark 5. If the cryptosystem IAPM-uniform (g,v,µ) with block size n in the private RP model is (t, q1, q2, m, $\varepsilon_1$)-secure for message integrity, then the above restriction in the theorem statement of only a single call to the decryption algorithm D can be removed. This is so because if D is called with a ciphertext not returned by an earlier call to the encryption algorithm E, then in the private RP model it will return $\perp$ with overwhelming probability (1-$\varepsilon_1$). Therefore, by induction, even in the public RP model $\perp$ will be returned with overwhelming probability. Hence, the environment need not make this call at all.

Remark 6. While the actual IAPM encryption scheme truncates the last block to obtain the "MAC tag", for the purpose of studying security, this truncation is not required, and we can assume that the whole last block is returned to the environment.

Proof: Note that since the environment E and adversary A are not computationally bounded, we can assume that they are deterministic. Also, note that underlying probability distribution is the key h chosen uniformly from H (the v-bit keys of g), and the choice of f as a random permutation. Thus, the space for the probability distribution is the set of pairs h and f. Any variable which is a function of h and f, will be called a random variable, and for clarity will be depicted in bold-face or capital. By the same convention, from now on, we will also denote f and h in bold-face, i.e. f and h. We will refer to f as the permutation, and h as the key. Fixed values of any random variables will be denoted by smallcase letters.

Without loss of generality, we can assume that the environment never repeats queries, and moreover it never calls d-iapm with a ciphertext returned by an earlier call to e-iapm. All queries by E to e-iapm will be called plaintexts, and the i-th such query will be denoted $P^i$. Individual blocks in $P^i$ will be denoted by subscripts. All replies to such queries will be called ciphertexts, and the i-th ciphertext will be denoted by $C^i$, and similarly, the j-th block on $C^i$ will be denoted $C_j^i$. All the $C^i$ together will be called C. The i-th query by A to f will be denoted $V^i$, and i-th query to $f^{-1}$ will be denoted $X^i$. The results of these queries will be denoted by $W^i$ and $Y^i$ resp. We will call the ciphertexts, $W^i$ and $Y^i$ together as the transcript $\tilde{C}$. Since, A and E are deterministic, all queries of E and A are a function of the transcript alone. The transcript itself is a random variable as it is a function of f and h.

The (single) query to d-iapm will be denoted by C' and will be called the forged ciphertext. It is also a function of the transcript $\tilde{C}$. Thus, given a fixed value $\tilde{c}$ of the transcript, all the plaintexts and the forged ciphertext are fixed as well (and in particular, do not depend on f and h). We will call all variables which are either part of the transcript or are a function of the transcript alone (i.e. are independent of f and h) as visible variables (these are visible to the environment). Thus, C, P, V, W, X, Y and C' are visible variables. We will refer to P' (which is the decryption of C') as a hidden variable, as it may not be output if the authentication test fails. However, it is computed by d-iapm, and indeed d-iapm further computes $T^*=f(\oplus_{j=1}^m P'_j \oplus g(h,\langle IV',m+1\rangle))$ to compare it (more precisely, $trunc_\mu(T^*)$) with the tag T given as part of C'. We will also refer to $\oplus_{j=1}^m P'_j$ as a hidden variable $P'_{m+1}$. Note that hidden variables are not a function of the transcript alone, and these may also depend on f and h.

We will denote values that are invoked on f in e-iapm as $M_j^i$, and its output as $N_j^i$. Note, $M_j^i=P_j^i \oplus g(h,\langle IV^i,j\rangle)$, and $N_j^i=C_j^i \oplus g(h,\langle IV^i,j\rangle)$. Similarly, the values invoked on $f^{-1}$ in d-iapm will be denoted $N'_j$ and its output by $M'_j$. Note, $N'_j=C'_j \oplus g(h,\langle IV',j\rangle)$. Since $P_j^i,C_j^i,C'_j$ (and also the IVs) are visible variables, each of these $M_j^i, N_j^i$ and $N'_j$ can be written as a function of $\tilde{C}$ and h.

Thus, all inputs to invocations of f and $f^{-1}$ in both e-iapm and d-iapm, except for the one used to compute T*, have the property that they are exclusive-or of a visible variable and g(h,a), where a is itself a visible variable. Associate to each such invocation of f and $f^{-1}$ a value a (for now, disregard the invocation of f to compute T*). Clearly, if the IV for all the queries to e-iapm are different, then the a values across different queries are different. Further, the a values within a query are different by design. For the forged ciphertext query to d-iapm, if IV' is different from all the IV in the e-iapm queries, then the a values used in the d-iapm query are also different within the d-iapm query and different from all a values used in e-iapm.

We will say that a block $C'_j$ in the forged ciphertext C' is in-place if $IV'=IV^i$ for some i, and $C'_j=C_j^i$, and $C_j^i$ is not the MAC tag block of ciphertext $C^i$. Note, in this case $N'_j=N_j^i$, and we will refer to $N'_j$ as also being in-place.

As for the computation of T* in d-iapm, we will denote the input to f to compute T* as $M'_{m+1}$. For now, we just observe that it is an exclusive-or of a hidden variable and g(h,a) for some visible variable a.

Now, given a fixed value of the transcript $\tilde{c}$, and a fixed value h of the key h, define the event i COL(h,$\tilde{c}$) (for internal collisions) as disjunction of some two $M_j^i$ being same, or some two $N_j^i$ being same, or some two $N'_j$ being same. Define x COL(h,$\tilde{c}$) (for external collision) as disjunction of some $M_j^i$ being same as some $V^{i'}$ or some $Y^{i'}$, or some $N_j^i$ being same as some $W^{i'}$ or some $X^{i'}$, or some $N'_{j'}$ being same as some $W^{i'}$ or some $X^{i'}$, or some $N'_{j'}$ that is not in-place being same as some $N_j^i$, or all $N'_{j'}$ are in-place and $M'_{m+1}$ is same as some $V^{i'}$ or some $Y^{i'}$. We will refer to disjunction of iCOL and xCOL as simply COL. Finally, if we also fix a value f for f, define h COL(f,h,$\tilde{c}$) (for hidden collision) as disjunction of some $M'_j$ (j=1 to m+1) being same as some $V^{i'}$ or some $Y^{i'}$.

Now, we are interested in the probability of the event COL(h,$\tilde{C}$) or h COL(f,h,$\tilde{C}$) happening. When neither of these events happen, the view of E is identical in the public and private RP model. Thus, its distinguishing probability is upper-bounded by the sum of the two collision probabilities. The bound on the collision probabilities follows by the following lemmas 4, 5, 6 and 7.

For $\tilde{c}$=(c,w,y), define $u_c$ to be the number of blocks in c, $u_w$ to be the number of blocks (queries) in w and $u_y$ be the number of blocks (queries) in y. For any fixed $\tilde{c}$, h, define $F_{\tilde{c},h}$ to be the set of permutations as follows: If COL(h,$\tilde{c}$) holds then this set is empty. Otherwise, the set contains all permutations f with the following restrictions:

$$\forall i,j: f(M_j^i(h,\tilde{c})) = N_j^i(h,\tilde{c}), \quad 1.$$

$$\forall i \in [1 \ldots u_w]: f(V^i(\tilde{c})) = w^i, \quad 2.$$

$$\forall i \in [1 \ldots u_y]: X^i(\tilde{c}) = f(y^i). \quad 3.$$

Define $|\tilde{c}| = u_c + u_w + u_y$. Then, for $\tilde{c}$, h, such that COL(h,$\tilde{c}$) does not hold, the probability $Pr_f[f \in F_{h,\tilde{c}}]$ depends only on $|\tilde{c}|$, and in particular is independent of h. Thus, for the rest of this paragraph, for any fixed $\tilde{c}$, consider any h such that $\neg$COL(h,$\tilde{c}$) holds. Moreover, define num($\tilde{c}$) to be the ratio of number of permutations on $2^n$ blocks and $|F_{h,\tilde{c}}|$, which is same as $(2^n)!/(2^n-|\tilde{c}|-1)!$. Note that $Pr_f[f \in F_{h,\tilde{c}}]$ is same as 1/num($\tilde{c}$).

Lemma 4. For any fixed $\tilde{c}$=(c,x,z), any fixed h such that $\neg$COL(h,$\tilde{c}$), and any fixed f, $\tilde{C}(f,h)=\tilde{c}$ is equivalent to $f \in F_{h,\tilde{c}}$.

Lemma 5. For any $\tilde{c}$=(c,x,z), $$Pr_{f,h}[\tilde{C} = \tilde{c} \wedge \neg COL(h, \tilde{c})] = \frac{1}{num(\tilde{c})} * Pr_h[\neg COL(h, \tilde{c})].$$

Let $u'_c$ be the number of blocks in C' (which is completely determined by $\tilde{c}$).

Lemma 6. For every constant transcript $\tilde{c}$, $Pr_h[COL(h,\tilde{c})] < (2(u_w + u_y) * (u_c + u'_c) + u_c(u_c + 1)) * \varepsilon$.

Lemma 7. For every constant transcript $\tilde{c}$, and every constant h such that $\neg$COL(h,$\tilde{c}$)

$$Pr_f[h \, COL(f,h,\tilde{c}) | f \in F_{h,\tilde{c}}] < (u_w + u_y) * 2^{-n}.$$

7.1 Corollaries

In this section, we state the various corollaries that obtain from the combination of theorems in Sections 5, 6, 7, and results from earlier works in the private random permutation model. To start with, we state a theorem from [15], which states the security of IAPM for message integrity in the private RP model.

Theorem 8. [15] Let g be an $\varepsilon$-xor-universal H-keyed (2n,n)-hash function, where H is the set of all v-bit strings (v≤n). Let A be an adaptive adversary in the message integrity experiment in the private RP model for the authenticated encryption scheme IAPM-uniform(g,v,µ) with block size n. Let A make at most z queries, these totaling at most m blocks. Let A make a query with at most v blocks in the second stage. If $4m^2 < 2^n$ and $4v^2 < 2^n$, then $$Succ_A \leq 2^{-\mu} + (m^2 + 3v) \cdot \varepsilon.$$

This theorem along with theorem 3 implies that IAPM-uniform (g,v,µ) is secure for message integrity in the public random permutation model, with $$Succ_A \leq 2^{-\mu} + (m^2 + 3v) \cdot \varepsilon + q * 2^{-n} + (2*q*m + m(m+1)) * \varepsilon,$$

where A makes at most z queries to the encryption oracle, these totaling at most m blocks, and A makes at most q queries to the public random permutation.

Then, using theorem 1, we get the following corollary for the composite IAPM scheme (Definition 4) that uses a key derivation function with oracle access to the same public random permutation.

Corollary 9. Let kdf be an oracle algorithm such that with its oracle instantiated with a public ideal primitive $\pi$, it is $(\infty, t_S, q_1, q_2, L, \varepsilon_1)$-indifferentiable from a v-bit RO. Let g be an $\varepsilon$-xor-universal H-keyed (2n,n)-hash function, where H is the set of all v-bit strings (v≤n). Let A be a 3-oracle adaptive adversary in the message integrity experiment in the public RP model for the authenticated encryption scheme IAPM (kdf,g,v,µ,κ) with block size n. Let A make at most z encryption queries, these totaling at most m blocks. Let A make a query with at most v blocks in the second stage. Let A make at most q queries to its first two oracles (the public random permutation). If $4m^2 < 2^n$ and $4v^2 < 2^n$, and $(m+q) < q_2$, then $Succ_A$ is at most $$2^{-\mu} + q * 2^{-n} + (2*q*m + 2m^2 + 3v) * \varepsilon + L * (m+q) * 2^{-\kappa} + \varepsilon_1.$$

A similar corollary (with similar bounds) holds for IND-CPA security of IAPM (kdf,g,v,µ,κ) in the public random permutation model, again by using theorems 3 and 1, and the known result from [15] about message secrecy of IAPM-uniform in the private RP model.

As for the IND-KDM security of IAPM, we have two options. One is to consider a scheme which has arbitrarily long bit-strings as key space as long as they have min-entropy κ, or one can consider KDM security with the keys chosen randomly and uniformly from v-bit strings. The latter is a realistic model if we assume that after applying the key-derivation function, the original κ-entropy key source is immediately and permanently deleted. This would also lead to a more efficient implementation, since for KDM security we must apply the key-derivation function to (a||r) afresh for each encryption. If a is the compact v-bit string (typically v is either 256 bits, or 512 bits or at a maximum 1024 bits), then applying the sponge-style random oracle implementation to (a||r) with r at most 512 bits would only need a single application of a 1600-bit permutation to get 1024 bits random oracle output (with 576-bit security, also known as capacity). Thus, we only formally state the corollary for KDM-security of the IAPM-uniform instance. Moreover, by our general composition theorem 1, we can continue to use the a key-derivation function built using the same public random permutation to derive this short v-bit uniform key. Note that theorem 2 only requires a single-use encryption scheme (see Remark 1 after that theorem). This means that we can instantiate with an IAPM scheme that does not require IVs, or the IV can be permanently set to zero.

Corollary 10. Let kdf be an oracle algorithm such that with its oracle instantiated with a public ideal primitive $\pi$, it is $(\infty, t_S, q_1, q_2, L, \varepsilon_1)$-indifferentiable from a v-bit RO. Let g be an $\varepsilon$-xor-universal H-keyed (2n,n)-hash function, where H is the set of all v-bit strings (v≤n). Let A be a 3-oracle adaptive adversary in the IND-KDM experiment in the public RP model for the authenticated encryption scheme obtained from zero-IV IAPM-uniform $(g,v,\mu)$ with block size n and kdf as per Definition 9. Let A make at most z encryption queries, these totaling at most m blocks. Let A make at most q queries to its first two oracles (the public random permutation). Let A only make (kdm) queries with description of 2-oracle algorithms $\phi$ that make at most $q_3$ oracle calls. If $4m^2 < 2^n$ and $4v^2 < 2^n$, and $(m+q+q_3) < q_2$, then $$\mathrm{Adv}_A^{kdm} \leq 2*q*2^{-n} + 2*(2*q*m + 2m^2)*\varepsilon +, \text{ and}$$

$$4*\varepsilon_1 + (m+q+q_3)*L*(z*2^{-\rho} + 2^{-v}).$$

We also need to prove that the scheme C as per Definition 9 instantiated with zero-IV IAPM-uniform $(g,v,\mu)$ is secure for message-integrity. This is proven by first noting that the adversary in the message-integrity experiment' find stage cannot distinguish between the real-world and the ideal world by Corollary 10. Thus, we can consider the adversary to be in the usual message-integrity experiment as in Section 3 for the scheme C (i.e. with no key-dependent message queries). The rest of the proof follows by showing that for each encryption query in the find stage, the key to IAPM-uniform is a uniformly random and independent v-bit value. This is proven similarly to the analysis in the proof of Theorem 2. The adversary's probability of success $\mathrm{Succ}_A$ is same as $\mathrm{Adv}_A^{kdm}$ but with additional terms $2^{-\mu} + v*L*(z*2^{-\rho} + 2^{-v})$, where v is the number of blocks in the second stage. Recall, $\mu$ is the length of the MAC tag.

8 Concrete Instance

We will instantiate the public random permutation by the permutation underlying SHA-3 [22], which in its draft standardization uses the Keccak hash function [4]. This hash function is built on a "cryptographic" permutation on 1600-bits called keccak-f[1600], and which we will just call keccak from now on. During and after the SHA-3 selection process, keccak has undergone extensive cryptanalysis, and is considered indistinguishable from a public random permutation. We will instantiate the public random permutation by keccak.

Thus, we consider block size n=1600. The key source K min-entropy can be kept just as in encryption modes using private random permutations such as keyed-AES. This is justified by the security bounds obtained for message-integrity (and similar bounds for message secrecy) in Corollary 9. Thus, we let $\kappa=128$ to be the min-entropy of the key-source. The $\varepsilon$-XOR-universal hash function g must have $\varepsilon \leq 2^{-256}$, as there are quadratic terms $q*m*\varepsilon$ in both Corollary 9 and 10. Thus, the size of the key v for IAPM-uniform should be at least 256 as well, and we will set v=256. We also let $\mu=128$ to be the MAC tag length. For KDM security $\rho$ should be 256 bits as well, though 128 bits may be enough. In the security bound obtained in Corollary 10 the dependence on $\rho$ is given by the term $(m+q+q_3)*z*2^{-\rho}$. Thus, the quadratic term comes from z, the total number of encryptions, and it does not lead to key-recovery, but just the possible loss of secrecy of that particular message.

The $\varepsilon$-xor-universal (2n,n)-hash function g is as follows. Let $\mathbb{F}$ be the Galois field $GF(2^{256})$. The key 256-bit key h to g is considered as an element of $\mathbb{F}$. The function g(h,IV,i), where IV and i are less than 128-bits long and are considered elements of $\mathbb{F}$ is computed as $g(h,IV,i) = h*(IV*2^{128} + i)$ in $\mathbb{F}$. It is extended to n=1600 bits by prefixing zero bits. Note in zero-IV IAPM, this just becomes h*i in $\mathbb{F}$. It is easy to see that this yields an $\varepsilon$-xor-universal hash function for inputs restricted to 128-bits, with $\varepsilon = 2^{-256}$.

To be precise, here is the complete KDM-secure authenticated encryption scheme IAPM:

In the initialization stage, let k be a key sampled from a source D with min-entropy $\kappa$. Run a kdf with 256-bits output on k to obtain k'. Permanently erase k.

To encrypt a message P, choose a fresh random 256-bit R, and compute $h = \mathrm{trunc}_{256}(\mathrm{keccak}(k' \| R))$. Run zero-IV IAPM-uniform encryption function on P with key h to obtain ciphertext C. Output $\langle R, C \rangle$.

To decrypt a ciphertext $\langle R, C \rangle$, compute $h = \mathrm{trunc}_{256}(\mathrm{keccak}(k' \| R))$, and run the zero-IV IAPM-uniform decryption function on C with key h. Output the result.

The kdf above can be implemented using the sponge construction [5] using keccak. Note that h above is obtained using a simple modification (optimization) of the sponge construction restricted to inputs that are at most 1600-bits.

8.1 Implementation

We implemented the above scheme on an Intel Xeon X5570 processor running at 3 GHz, with SSE4 SIMD-instruction set and no native AES instruction. The above KDM-secure IAPM algorithm achieved 3250 mbps (megabits per second) on a single core on messages of size 16000 bytes. Our implementation used a double-permutation implementation of keccak from the Keccak package, which utilizes the 128-bit SIMD-instructions. In contrast, IAPM running with keyed-AES using the fastest AES implementation available (as per SUPERCOP [23] profiling on the machine) achieved only 968 mbps performance (note, there is no native AES support on this processor).

REFERENCES

[1] Advanced Encryption Standard. FIPS 197, 2001.

[2] M. Bellare, A. Desai, E. Jokipii, and P. Rogaway. A concrete security treatment of symmetric encryption. In 38th FOCS, pages 394-403. IEEE Computer Society Press, October 1997.

[3] M. Bellare and P. Rogaway. Random oracles are practical: A paradigm for designing efficient protocols. In V. Ashby, editor, ACM CCS 93, pages 62-73. ACM Press, November 1993.

[4] G. Bertoni, J. Daemen, M. Peeters, and G. V. Assche. Keccak. In T. Johansson and P. Q. Nguyen, editors, EUROCRYPT 2013, volume 7881 of LNCS, pages 313-314. Springer, May 2013.

[5] G. Bertoni, J. Daemen, M. Peeters, and G. Van Assche. On the indifferentiability of the sponge construction. In N. P. Smart, editor, EUROCRYPT 2008, volume 4965 of LNCS, pages 181-197. Springer, April 2008.

[6] G. Bertoni, J. Daemen, M. Peeters, and G. Van Assche. Duplexing the sponge: Single-pass authenticated encryption and other applications. In A. Miri and S. Vaudenay, editors, SAC 2011, volume 7118 of LNCS, pages 320-337. Springer, August 2011.

[7] J. Black, P. Rogaway, and T. Shrimpton. Encryption-scheme security in the presence of key-dependent messages. In K. Nyberg and H. M. Heys, editors, SAC 2002, volume 2595 of LNCS, pages 62-75. Springer, August 2002.

[8] J. Camenisch and A. Lysyanskaya. An efficient system for non-transferable anonymous credentials with optional anonymity revocation. In B. Pfitzmann, editor, *EUROCRYPT* 2001, volume 2045 of *LNCS*, pages 93-118. Springer, May 2001.

[9] R. Canetti. Universally composable security: A new paradigm for cryptographic protocols. In *42nd FOCS*, pages 136-145. IEEE Computer Society Press, October 2001.

[10] R. Canetti, Y. Dodis, R. Pass, and S. Walfish. Universally composable security with global setup. In S. P. Vadhan, editor, *TCC* 2007, volume 4392 of *LNCS*, pages 61-85. Springer, February 2007.

[11] J.-S. Coron, Y. Dodis, C. Malinaud, and P. Puniya. Merkle-Damgård revisited: How to construct a hash function. In V. Shoup, editor, *CRYPTO* 2005, volume 3621 of *LNCS*, pages 430-448. Springer, August 2005.

[12] J. Daemen. Limitations of the Even-Mansour construction (rump session). In H. Imai, R. L. Rivest, and T. Matsumoto, editors, *ASIACRYPT '91*, volume 739 of *LNCS*, pages 495-498. Springer, November 1991.

[13] S. Even and Y. Mansour. A construction of a cipher from a single pseudorandom permutation. In H. Imai, R. L. Rivest, and T. Matsumoto, editors, *ASIACRYPT '91*, volume 739 of *LNCS*, pages 210-224. Springer, November 1991.

[14] C. S. Jutla. Encryption modes with almost free message integrity. In B. Pfitzmann, editor, *EUROCRYPT* 2001, volume 2045 of *LNCS*, pages 529-544. Springer, May 2001.

[15] C. S. Jutla. Encryption modes with almost free message integrity. *Journal of Cryptology*, 21(4):547-578, October 2008.

[16] H. Krawczyk. LFSR-based hashing and authentication. In Y. Desmedt, editor, *CRYPTO '94*, volume 839 of *LNCS*, pages 129-139. Springer, August 1994.

[17] K. Kurosawa. Power of a public random permutation and its application to authenticated encryption. *IEEE Transactions on Information Theory*, 56(10):5366-5374, 2010.

[18] U. M. Maurer, R. Renner, and C. Holenstein. Indifferentiability, impossibility results on reductions, and applications to the random oracle methodology. In M. Naor, editor, *TCC* 2004, volume 2951 of *LNCS*, pages 21-39. Springer, February 2004.

[19] B. Pfitzmann and M. Waidner. Composition and integrity preservation of secure reactive systems. In S. Jajodia and P. Samarati, editors, *ACM CCS* 00, pages 245-254. ACM Press, November 2000.

[20] P. Rogaway, M. Bellare, J. Black, and T. Krovetz. OCB: A block-cipher mode of operation for efficient authenticated encryption. In *ACM CCS* 01, pages 196-205. ACM Press, November 2001.

[21] Secure Hash Standard. FIPS 180-4, 2012.

[22] SHA-3 Standard: Permutation-Based Hash and Extendable-Output Functions. Draft FIPS 202, 2014.

[23] SUPERCOP:eBASC. At website bench.cr.yp.to/primitives-stream.html.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following abbreviations that may be found in the specification and/or the drawing figures are defined as follows:

AES Advanced Encryption Standard
CBC Cipher-Block-Chain
IAPM Integrity-Aware-Parallelizable Mode
OCB Offset-Code-Book
PMAC Parallelizable Message Authentication Code
SHA Secure Hash Algorithm
XOR exclusive OR

What is claimed is:

1. A method, comprising:
conducting by a first computer system encrypted communication with a second computer system using a keyless public random permutation, the conducting comprising the following:
exchanging randomness, wherein the exchanging comprises transmitting the randomness from the first computer system to the second computer system and receiving the randomness at the first computer system from the second computer system;
deriving by the first computer system a uniformly random key from the randomness, where the deriving of the uniformly random key from the randomness comprises splitting the randomness into a multitude of blocks and iteratively applying the keyless public random permutation to the multitude of blocks;
encrypting by the first computer system a multitude of blocks of plaintext using the uniformly random key to create a corresponding multitude of blocks of ciphertexts, wherein the deriving and encrypting each uses the same keyless public random permutation; and
transmitting by the first computer system the multitude of blocks of ciphertexts to the second computer system to be used by the second computer system to decrypt the multitude of blocks of ciphertexts in a decryption process using the exchanged randomness, wherein the decryption process to be performed by the second computer system also uses the same keyless public random permutation.

2. The method of claim 1, where the deriving of the uniformly random key from the randomness further comprises iteratively applying the keyless public random permutation to an intermediate result of the iterative application of the keyless public random permutation, wherein the iteratively applying produces an intermediate result for each iteration and the iterative application of the keyless public random permutation uses the intermediate result and a current block for the keyless public random permutation for all but a first iteration where only a first block is used for the keyless public random permutation.

3. The method of claim 2, wherein a result of a final application of the keyless public random permutation for a final iteration is divided into two pieces, wherein a first piece is not used and a second piece is output as the uniformly random key.

4. The method of claim 1, wherein the encrypting of the multitude of blocks of plaintext includes generating a whitening sequence from the uniformly random key.

5. The method of claim 4, wherein generating the whitening sequence applies an exclusive-or universal hash function to the uniformly random key and an index number of a block of plaintext input from the multitude of plaintext blocks.

6. The method of claim 4, wherein generating the whitening sequence from the uniformly random key comprises whitening each of the multitude of plaintext blocks with a corresponding element from the whitening sequence by using a bit-wise exclusive-or operation.

7. The method of claim 6, wherein encrypting of the multitude of blocks of plaintext comprises applying the keyless public random permutation to each of the multitude of whitened plaintext blocks.

8. The method of claim 7, wherein encrypting of the multitude of blocks of plaintext comprises whitening each block of output of the keyless public random permutation by the corresponding whitening sequence element using a bit-wise exclusive-or operation.

9. The method of claim 1, wherein the keyless public random permutation is the public random permutation of a SHA-3 hash function.

10. The method of claim 1, further comprising:
simultaneously with encrypting, generating an authentication tag based on the multitude of blocks of plaintexts.

11. The method of claim 10, wherein generating the authentication tag use a same public random permutation.

12. A computer system comprising:
one or more memories comprising computer-readable code;
one or more processors configuring the apparatus, in response to execution of the computer-readable code, to perform the following:
conducting by the computer system encrypted communication with another computer system using a keyless public random permutation, the conducting comprising the following:
exchanging randomness, wherein the exchanging comprises transmitting the randomness from the computer system to the other computer system and receiving the randomness at the computer system from the other computer system;
deriving by the computer system a uniformly random key from the randomness, where the deriving of the uniformly random key from the randomness comprises splitting the randomness into a multitude of blocks and iteratively applying the keyless public random permutation to the multitude of blocks;
encrypting by the computer system a multitude of blocks of plaintext using the uniformly random key to create a corresponding multitude of blocks of ciphertexts, wherein the deriving and encrypting each uses the same keyless public random permutation; and
transmitting by the computer system the multitude of blocks of ciphertexts to the other computer system to be used by the other computer system to decrypt the multitude of blocks of ciphertexts in a decryption process using the exchanged randomness, wherein the decryption process to be performed by the second computer system also uses the same keyless public random permutation.

13. The computer system of claim 12, where the deriving of the uniformly random key from the randomness further comprises iteratively applying the keyless public random permutation to an intermediate result of the iterative application of the keyless public random permutation, wherein the iteratively applying produces an intermediate result for each iteration and the iterative application of the keyless public random permutation uses the intermediate result and a current block for the keyless public random permutation for all but a first iteration where only a first block is used for the keyless public random permutation.

14. The computer system of claim 13, wherein a result of a final application of the keyless public random permutation for a final iteration is divided into two pieces, wherein a first piece is not used and a second piece is output as the uniformly random key.

15. The computer system of claim 12, wherein the encrypting of the multitude of blocks of plaintext includes generating a whitening sequence from the uniformly random key.

16. The computer system of claim 12, wherein the public random permutation is the public random permutation of the SHA-3 hash function.

17. A method, comprising:
conducting by a first computer system encrypted communication with a second computer system using a keyless public random permutation, the conducting comprising the following:
exchanging randomness, wherein the exchanging comprises transmitting the randomness from the first computer system to the second computer system and receiving the randomness at the first computer from the second computer;
deriving by the first computer system a uniformly random key from the randomness, where the deriving of the uniformly random key from the randomness comprises splitting the randomness into a multitude of blocks and iteratively applying the keyless public random permutation to the multitude of blocks;
generating by the first computer system an authentication tag on a multitude of blocks of plaintexts,
wherein the deriving and generating each uses a public random permutation; and
sending by the first computer system the authentication tag and the multitude of blocks of plaintext to the second computer system for authentication of the plaintext by the second computer system,
where both deriving of the uniformly random key and generating the authentication tag use a same keyless public random permutation.

* * * * *